(12) United States Patent
Myron et al.

(10) Patent No.: US 12,461,923 B2
(45) Date of Patent: Nov. 4, 2025

(54) SUITABILITY METRICS BASED ON ENVIRONMENTAL SENSOR DATA

(71) Applicant: T-Mobile USA, Inc., Bellevue, WA (US)

(72) Inventors: Peter Myron, Fall City, WA (US); Michael Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 233 days.

(21) Appl. No.: 17/192,869

(22) Filed: Mar. 4, 2021

(65) Prior Publication Data

US 2022/0284026 A1 Sep. 8, 2022

(51) Int. Cl.
  *G06F 16/28* (2019.01)
  *G06F 16/2457* (2019.01)
  *G06Q 30/0201* (2023.01)

(52) U.S. Cl.
  CPC ... *G06F 16/24575* (2019.01); *G06Q 30/0201* (2013.01)

(58) Field of Classification Search
  CPC .... G06F 16/48; G06F 16/9038; G06F 16/904; G06F 16/907; G06F 16/438
  USPC ........ 707/600, 607, 702–703, 694, E17.009, 707/E17.066
  See application file for complete search history.

(56) References Cited

U.S. PATENT DOCUMENTS

| | | | |
|---|---|---|---|
| 10,097,241 B1 * | 10/2018 | Bogdan | H04N 7/183 |
| 10,580,039 B1 * | 3/2020 | Collins | G06F 16/24578 |
| 11,276,395 B1 * | 3/2022 | Jones | G10L 15/02 |
| 2010/0076835 A1 * | 3/2010 | Silverman | G06Q 30/0233 705/14.33 |
| 2011/0161076 A1 * | 6/2011 | Davis | H04M 1/72448 704/E15.001 |
| 2012/0215602 A1 * | 8/2012 | Ramer | G06Q 30/02 705/14.55 |
| 2013/0012231 A1 * | 1/2013 | Hall | H04W 4/38 455/456.2 |
| 2013/0149626 A1 * | 6/2013 | Braithwaite | H01M 8/0432 429/444 |
| 2015/0330817 A1 * | 11/2015 | Law | G16Z 99/00 702/19 |
| 2016/0170996 A1 * | 6/2016 | Frank | G06F 16/337 707/748 |

(Continued)

*Primary Examiner* — Tony Mahmoudi
*Assistant Examiner* — Linh Black

(57) ABSTRACT

A suitability analysis platform may receive one or more environmental parameter values of one or more environmental parameters collected for a plurality of sites by multiple sensor devices. The platform may aggregate the one or more environmental parameter values collected for each site of the plurality of sites by each site. Subsequently, the platform may receive queries for suitable sites for performing activities from user devices, in which each of the queries includes one or more environmental parameter value criteria for at least one corresponding environmental parameter of a suitable site for performing a specific activity. The platform may provide responses to the queries in which each response includes information on one or more sites of the plurality of sites with one or more environmental parameter values that match or are closest to the one or more environmental parameter value criteria of the corresponding query.

13 Claims, 10 Drawing Sheets

(56) References Cited

U.S. PATENT DOCUMENTS

| | | | | |
|---|---|---|---|---|
| 2016/0357181 | A1* | 12/2016 | Marakkannu | G08B 29/02 |
| 2017/0208420 | A1* | 7/2017 | Wang | H04L 41/22 |
| 2017/0243028 | A1* | 8/2017 | LaFever | G06F 21/6254 |
| 2018/0315074 | A1* | 11/2018 | Nash | G06Q 30/0267 |
| 2019/0043493 | A1* | 2/2019 | Mohajer | G10L 17/00 |
| 2019/0287183 | A1* | 9/2019 | Bishnoi | G06F 7/08 |
| 2019/0289058 | A1* | 9/2019 | Bhoj | H04L 43/0805 |
| 2019/0388783 | A1* | 12/2019 | Gódor | A63F 13/92 |
| 2020/0225655 | A1* | 7/2020 | Cella | G06F 18/2178 |
| 2020/0302562 | A1* | 9/2020 | Trim | G06Q 90/205 |
| 2020/0364588 | A1* | 11/2020 | Knox | G06V 40/20 |
| 2020/0384367 | A1* | 12/2020 | Lake-Schaal | A63F 13/70 |
| 2021/0103260 | A1* | 4/2021 | Khurana | G05B 23/0237 |
| 2021/0133670 | A1* | 5/2021 | Cella | G06N 3/044 |
| 2021/0182996 | A1* | 6/2021 | Cella | G06Q 30/0202 |
| 2021/0295446 | A1* | 9/2021 | Mangold | G06Q 10/04 |
| 2021/0404831 | A1* | 12/2021 | Drummond | G01C 21/3614 |
| 2023/0173395 | A1* | 6/2023 | Cella | G06F 21/64 |
| | | | | 463/25 |

\* cited by examiner

SUITABILITY METRICS BASED ON ENVIRONMENTAL SENSOR DATA

BACKGROUND

In determining the suitability of a site for a particular activity (e.g., working on a computer, making a phone call, resting, studying, exercising, shopping), environmental parameters at the location may be significant determining factors. Examples of influential environmental parameters may include temperature, air quality (e.g., presence of various pollutants), ambient noise, as well as technological environmental parameters such as radio signal strengths associated with various types of short-range and long-range wireless communication networks. Currently, such data may not be available or may not be available with sufficient frequency, reliability, and/or spatial resolution for the determination of whether a site is suitable for a particular activity.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
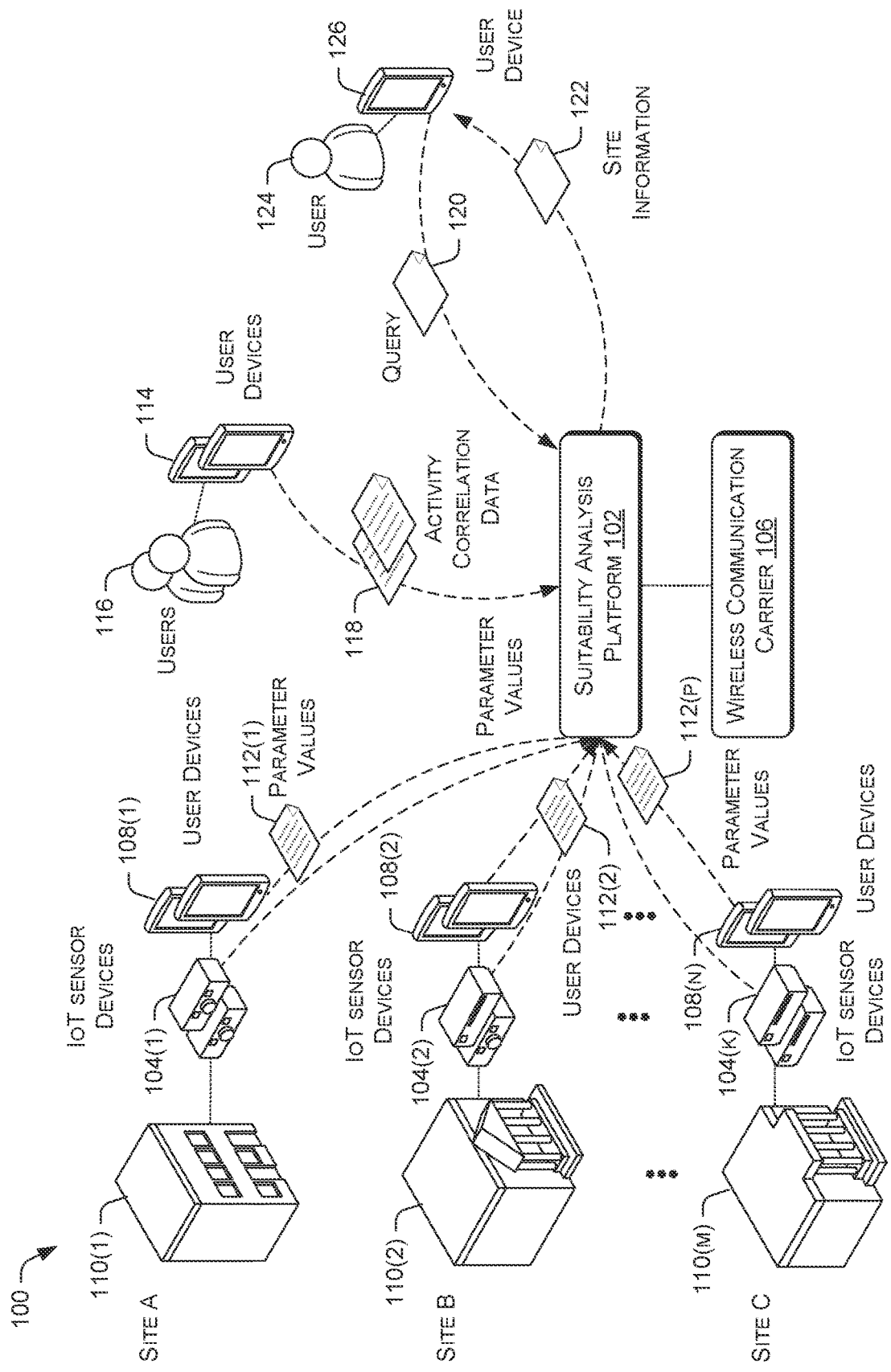
FIG. 1 illustrates an example architecture for using various detected environmental parameter values to determine suitability of different sites for performing an activity.

This disclosure is directed to techniques that use deployed Internet-of-Things (IoT) sensors or sensors on user devices (e.g. smartphones) to detect the environmental parameter values of the environmental parameters at a site or multiple sites. A site may be a building (e.g., a retail store), a floor within the building, a particular location on a particular floor of the building, or an outdoor area. The collected data may be aggregated by each site for analysis by a suitability analysis platform.

In one scenario, the suitability analysis platform may receive inputs of activities (e.g., working on a computer, making a phone call, exercising, socializing, eating, etc.) that users want to perform at the different sites and their preferred environmental parameter values for performing the activities. Based on a correlation analysis, the suitability analysis platform may determine a set of environmental parameter values that are most conducive to each type of activity. Accordingly, when the suitability analysis platform receives a user query for sites to perform a specific activity, the platform may return a list of one or more sites that has the set of the preferred environmental parameter values or has environmental parameter values that are close to the preferred values. In some instances, the platform may also generate a suitability map that shows the suitability of multiple sites, as well as the environmental parameter values at each site. In some instances, users may be encouraged to use their user devices to collect certain environmental parameter values (e.g., ambient noise level) at specific sites or input suitable activities that can be done at different sites for analysis with credits or points that can be used to redeem for products or services. Gamification may also be used, e.g., giving credits or points, or giving additional credits or points, to encourage users to use their user devices to collect environmental parameter values at certain sites and/or at certain times of day, week, month, season, or year, or any other time frame.

In another scenario, the suitability analysis platform may receive environmental parameter values for sites, such as retail sites. The environmental parameter values can be correlated with customer activity metrics (e.g., date and time of visit, duration of visit, etc.), customer purchase metrics, and/or customer demographic data for each of the sites. In some instances, environmental parameter values may be collected for multiple locations within each site. Accordingly, the suitability analysis platform may identify environmental parameter values that correlate with a highest volume of customer visit activity or a highest volume of customer purchases. Such environmental parameter values can then be recommended for adoption at multiple sites or even different locations within a site to drive customer foot traffic or customer purchases. Alternatively, the suitability analysis platform may identify environmental parameter values that correlate with different customer demographic segments. Accordingly, when a site is visited by customers that are predominately in a particular customer demographic segment, such as during a particular time period of the day, the platform may recommend certain environmental parameter values that correlate with the particular customer demographic segment be implemented for the particular time period. Other uses include translating the environmental parameter values into environmental parameter descriptions (e.g., noisy, quiet, hot, cold, etc.). Such environmental parameter descriptions can then be compared with environmental parameter descriptions posted on online review websites to determine if the posted descriptions are accurate. If the posted descriptions are not accurate, the platform may send discrepancy notifications to the online review websites.

In some embodiments, the suitability analysis platform may receive one or more environmental parameter values of one or more environmental parameters collected for a plurality of sites by multiple sensor devices. The multiple sensor devices may include one or more user devices and/or one or more IoT sensor devices. The platform may aggregate the one or more environmental parameter values collected for each site of the plurality of sites by each site. Subsequently, the platform may receive queries for suitable sites for performing activities from user devices, in which each of the queries includes one or more environmental parameter value criteria for at least one corresponding environmental parameter of a suitable site for performing a specific activity. The platform may provide responses to the queries in which each response includes information on one or more sites of the plurality of sites with one or more environmental parameter values that match or are closest to the one or more environmental parameter value criteria of the corresponding query. The platform may further correlate the activities specified by the queries with the one or more sites having one or more environmental parameter values to generate correlated environmental data for the one or more sites. The platform may additionally analyze the correlated environmental data of the plurality of sites to determine a corresponding most common environmental parameter value for each of one or more environmental parameters associated with an activity.

In other embodiments, the suitability analysis platform may receive one or more environmental parameter values of one or more environmental parameters collected for a plurality of sites by multiple sensor devices. The multiple sensor devices may include one or more user devices and/or one or more IoT sensor devices. The platform may aggregate the one or more environmental parameter values collected for each site of the plurality of sites by each site. The platform may further receive information regarding one or more activities that are designated as suitable for individual sites of the plurality of sites from user devices of users. The platform may then correlate the one or more activities that are designated as suitable for individual sites of the plurality of sites with corresponding one or more environmental parameter values collected for the individual sites to generate correlated environmental data for the plurality of sites. The platform may receive a query for at least one suitable site for performing a specific activity that includes a list of one or more environmental parameter value criteria for at least one environmental parameter from a user device. Subsequently, the platform may provide a response to the query that includes information on one or more sites of the plurality of sites that are designated as suitable for the specific activity and with one or more environmental parameter values that match or are closest to the one or more environmental parameter value criteria.

In additional embodiments, the suitability analysis platform may receive one or more environmental parameter values of one or more environmental parameters collected for each site of multiple sites by multiple sensor devices. The multiple sensor devices may include one or more user devices and/or one or more IoT sensor devices. The platform may aggregate the one or more environmental parameter values collected for each site of the multiple sites by each site. The platform may additionally receive customer purchase metrics of customers associated with each site of the multiple sites. The platform may compare the customer purchase metrics at each site with the one or more environmental parameter values collected for each site to determine one or more environmental parameter values of a site that correlated with a highest customer purchase metric. Subsequently, the platform may provide a recommendation to implement the one or more environmental parameter values at an additional site with at least one environmental parameter value that is different from at least one corresponding environmental parameter value of the one or more environmental parameter values.

The techniques may enable an analysis platform to crowd-source information from multiple user devices and remote sensor devices to determine environmental parameter values of different sites or location within sites that are most conducive to perform a particular activity or make a purchase decision. Accordingly, the analysis platform may select and recommend a site or a location within a site that is must conducive for performing an activity in response to a query. Alternatively, the analysis platform may use such crowd environmental parameter values to select a set of parameter values form implementation in additional sites. The techniques described herein may be implemented in a number of ways. Example implementations are provided below with reference to the following figures.

Example Architectures

FIG. 1 illustrates an example architecture 100 for using various detected environmental parameter values to determine suitability of different sites for performing an activity. A suitability analysis platform 102 may receive environmental parameter values of environmental parameters from multiple Internet-of-Things (IoT) sensor devices 104(1)-104(k). The multiple IoT sensors may be IoT devices that are equipped with sensors. Generally speaking, IoT devices are miniaturized devices that have limited data processing capabilities, limited data storage capacity, and limited energy reserve in the form of a battery. For example, such an IoT sensor device may be built using a Raspberry Pi computer. The IoT devices may have a limited built-in user interface (e.g., status indicators) or may lack any built-in user interface. However, the IOT devices may be equipped with radio transceivers that enable the devices to connect to other devices via short-range communication (e.g., Bluetooth) and/or long-range communication (e.g., cellular communication) using services provided by a wireless carrier network that is operated by a wireless communication carrier 106. The wireless carrier network operated by the wireless communication carrier 106 may provide a wide range of mobile communication services, as well as ancillary services and features, to users and associated mobile device users. The wireless carrier network may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the wireless carrier network may include one or more RANs and a regional circuit and/or packet-switched network and associated signaling network facilities. The wireless carrier network may provide telecommunication and data communication in accordance with one or more technical standards, such as Enhanced Data Rates for GSM Evolution (EDGE), Wideband Code Division Multiple Access (W-CDMA), Highest-Speed Packet Access (HSPA), Long Term Evolution (LTE), CDMA-2000 (Code Division Multiple Access 2000), and/or so forth. In some embodiments, the core network of the wireless carrier network may be accessed via wired or wireless LANs. For example, a wireless local area network may be a network that is established using Wi-Fi or Bluetooth standards and hardware.

In various embodiments, the sensors of the IoT sensor devices 104(1)-104(k) may detect values associated with various environmental parameters. For example, the sensors may include an ambient light level sensor, an air temperature sensor, a humidity sensor, an ambient noise sensor, an air quality sensor, a radio signal sensor for detecting the signal strengths of short-range communication signals or long-range communication signals, and/or so forth. For example, the air quality sensor may be a sensor that is configured to sense the quantity of certain environmental pollutants, such as particulate matter (PM), nitrogen oxides (NOx), carbon monoxides (CO), volatile organic compounds (VOCs), sulfur oxides (SOx), and/or so forth. The particulate matters may include particulate matter that are 10 micrometers or smaller, i.e., $PM_{10}$, particulate matter that are smaller than 2.5 micrometers, i.e., $PM_{2.5}$, and/or so forth. Accordingly, the IoT sensor devices 104(1)-104(k) may collect environmental parameter values and provide the values to the suitability analysis platform 102 via the wireless carrier network.

Alternatively, or concurrently, the suitability analysis platform 102 may also receive environmental parameter values of environmental parameters from multiple user devices 108(1)-108(m). In some instances, the user devices 108(1)-108(m) may be devices that are used by the users of the wireless communication carrier 106. The user devices 108(1)-108(m) may include portable user devices, such as a smartphone, a smartwatch, a tablet computer, etc., that receive telecommunication services from the wireless carrier network of wireless communication carrier 106. Alternatively, the user devices 108(1)-108(m) may include non-portable user devices, such as network modems, routers, and/or Wi-Fi hotspots that are deployed at particular locations to provide or distribute Internet connectivity that is offered by the wireless carrier network of the wireless communication carrier 106 to other user devices. In some embodiments, the user devices 108(1)-108(m) may use built-in environmental parameter sensors to collect environmental parameter values. For example, such built-in sensors may include an ambient light level sensor (e.g., a built-in camera), an ambient noise sensor (e.g., a built-in microphone), a radio signal sensor (e.g. a built-in radio transceiver), and/or so forth. In other embodiments, the user devices 108(1)-108(m) may use external attachable sensors to collect environmental parameter values. For example, such external attachable sensors may include an air temperature sensor, a humidity sensor, an air quality sensor, an electromagnet field (EMF) sensor, and/or so forth. Accordingly, the user devices 108(1)-108(m) may collect environmental parameter values and provide the values to the suitability analysis platform 102 via the wireless carrier network. In some instances, the suitability analysis platform 102 may be affiliated with the wireless communication carrier 106. For example, the suitability analysis platform 102 may be operated by or controlled by the wireless communication carrier 106.

The IoT sensor devices 104(1)-104(k) may be deployed at multiple sites, such as the sites 110(1)-110(m). In various embodiments, a site may refer to a building, a particular location in the building (e.g., a room, a hallway, a floor, etc.), or an outdoor area. Accordingly, a site may have one or more IoT sensor devices installed that continuously and/or periodically monitor the environmental parameters at the site. Likewise, non-portable user devices included in the user devices 108(1)-108(n) may be similarly deployed at the sites 110(1)-110(m). On the other hand, portable user devices included in the user devices 108(1)-108(n) may collect environmental parameter values of the sites 110(1)-110(m) when they are carried to the sites 110(1)-110(m) by their users, such as the users of a wireless carrier network of the wireless communication carrier 106. For example, a client application on a portable user device may activate the one or more environmental parameter sensors of the portable user device to obtain one or more environmental parameter values when the client application determines that the device is at or within a predetermined geolocation associated with a site. For example, the client application may make the determination when the application detects a short-range radio beacon (e.g., a Bluetooth beacon) that is deployed at the site. In another example, the client application may make the determination based on the geolocation coordinates provided by a geolocation sensor, such as a global positioning system (GPS) sensor. In the example shown in FIG. 1, the IoT sensor devices 104(1) and/or the user devices 108(1) may provide environmental parameter values 112(1) associated with the site 110(1) to the suitability analysis platform 102. The IoT sensor devices 104(2) and/or the user devices 108(2) may provide environmental parameter values 112(2) associated with the site 110(2) to the suitability analysis platform 102. Likewise, the IoT sensor devices 104(k) and/or the user devices 108(n) may provide environmental parameter values 112(p) associated with the site 110(m) to the suitability analysis platform 102. Once the suitability analysis platform 102 has received the environmental parameter values for the various sites, the suitability analysis platform 102 may aggregate the values according to site.

Subsequently, the suitability analysis platform 102 may receive input of activities (e.g., working on a computer, making a phone call, exercising, socializing, eating, etc.) that users want to perform at the different sites and their preferred environmental parameter values for performing the activities. For example, the suitability analysis platform 102 may receive such inputs from user devices 114 of users 116. In some embodiments, the users 116 may be prompted to input environmental values that they consider ideal for performing each of the activities. For example, the users 116 may be prompted to provide such information as a part of a crowdsourced survey conducted by an operator of the suitability analysis platform 102. In other embodiments, the users 116 may input activities that they wish to perform in conjunction with a set of desired environmental parameter values for the activities as the users 116 look for suitable sites to perform the activities. In turn, the suitability analysis platform 102 may perform a correlation analysis for such activity correlation data 118 between the inputted activities and their associated environmental parameter values to determine a set of parameter values that are most conducive, e.g., most common, to each type of activity.

Accordingly, when the suitability analysis platform 102 receives a user query 120 for sites to perform a specific activity, the platform may return site information 122 that includes a list of one or more sites that has the set of the environmental parameter values that are most conducive for the activity. However, if no site with the set of environmental parameter values are found, the platform may return a predetermined number of sites, such as one or two sites, with environmental parameter values that are closest to the most conductive environmental parameter values. For example, the user query 120 may be inputted by a user 124 via a client application on the user device 126. The query may be for sites within a predetermined distance of a current location of the user 124 that are suitable for working on a computer. In turn, the suitability analysis platform 102 may return a list of one or more sites within the predetermined distance that match or are closest to the set of most conducive environmental parameter values to the user device 126. In some instances, the platform may also generate a suitability map that shows the suitability of multiple sites, as well as the environmental parameter values at each site, for presentation by the client application on the user device 126.

In some instances, the suitability analysis platform 102 may be configured to encourage the users 116 to use their user devices 114 to collect certain environmental parameter values (e.g., ambient noise level) at specific sites or input suitable activities that can be done at different sites for analysis with credits or points that can be redeemed for products or services from merchants. For example, such credits or points may be redeemed for products or services from the wireless communication carrier 106. In other instances, the suitability analysis platform 102 may be configured to use gamification, e.g., give credits or points, or give additional credits or points, to encourage the users 116 to use their user devices to collect environmental parameter values at certain sites and/or at certain times of day, week, month, season, year, or any other configurable time frame.

Figure 2:
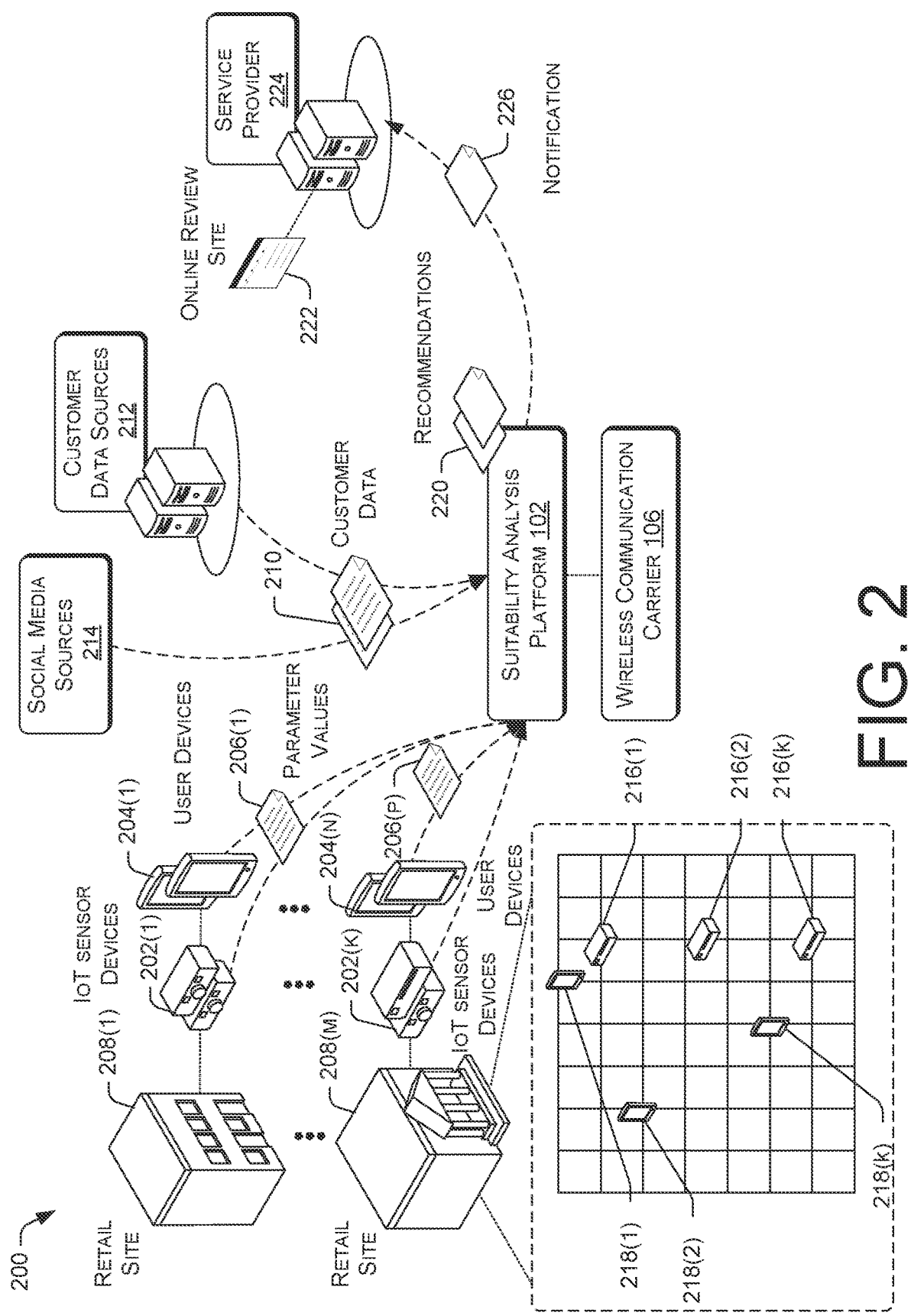
FIG. 2 illustrates an example architecture for using various detected environmental parameter values to determine suitability of different sites for consumer activities.

FIG. 2 illustrates an example architecture 200 for using various detected environmental parameter values to determine suitability of different sites for consumer activities. For example, the different sites may be retail sites. The architecture may include the suitability analysis platform 102 and the wireless communication carrier 106. Further, the IoT sensor devices and the user devices shown in FIG. 2 are similar to the corresponding devices shown in FIG. 1. As an example, IoT sensor devices 202(1) and user devices 204(1) may be used to collect environmental parameter values 206(1) from retail site 208(1). Likewise, IoT sensor devices 202(k) and user devices 204(n) may be used to collect environmental parameter values from retail site 208(m). For example, a retail site may be a store, a restaurant, a coffee shop, or some other business establishment. In some embodiments, environmental parameter values may be collected from multiple locations within a retail site. For example, the retail site 208(m) may have multiple IoT sensor devices 216(1)-216(k) deployed at different locations with the retail site 208(m) to collect local environmental parameter values. In some instances, the IoT sensor devices 216(1)-216(k) may be positioned at regularly spaced locations within the retail site 208(m), such as along multiple spaced positions along aisles within the location or at each store department within the location. In other instances, the IoT sensor devices 216(1)-216(k) may be positioned at key locations within the retail site, such as at the entrances or exits, as well as where customer service desks are stationed. Further, the user devices 218(1)-218(k) may also collect local environmental parameter values as customers who are in possession of the user devices 218(1)-218(k) move around the retail site 208(m).

Additionally, the suitability analysis platform 102 may receive customer data 210 from one or more customer data sources 212. The one or more customer data sources 212 may include databases that are maintained by a merchant that operates the retail sites 208(1)-208(m). In one instance, the merchant of the retail sites 208(1)-208(m) may be the wireless communication carrier 106. Alternatively, or concurrently, the suitability analysis platform 102 may obtain the customer data 210 from one or more social media sources 214. The social media sources 214 may include microblogging sites, social media sites, media sharing sites, and/or so forth. For example, the platform 102 may use a data mining and correlation engine to obtain customer demographic data from the social media sources 214. The customer data 210 may include customer activity metrics, customer purchase metrics, and/or customer demographic data that pertains to retail sites 208(1)-208(m). For example, the customer activity metrics of a customer with respect to a retail site may include date and time of the visit, duration of the visit, and/or so forth. In some instances, the customer activity metrics of the customer may also include dates and times that the customer visited the various locations with the retail site, loitering durations at the various locations within the retail sites, and/or so forth. The customer purchase metrics of a customer with respect to a retail site may include date and time of purchases at the retail site, amount of each purchase at the retail site, number of returned purchases at the retail site, customer satisfaction survey results with respect to purchases made at the retail sites, and/or so forth. The customer demographic data of a customer may include an age, a gender, a credit worthiness rating, an estimated household income, and/or so forth.

In various embodiments, the suitability analysis platform 102 may correlate the environmental parameter values collected for each retail site with the customer data collected for each site. Accordingly, the suitability analysis platform 102 may identify environmental parameter values that correlate with highest volume of customer visit activity or highest volume of customer purchases. Such environmental parameter values can then be recommended for adoption at multiple retail sites or even different locations within a site to drive customer foot traffic or customer purchases. Alternatively, the suitability analysis platform 102 may identify environmental parameter values that correlate with different customer demographic segments. Accordingly, when a retail site is visited by customers that are predominately in a particular customer demographic segment, such as during a particular time period of the day, the suitability analysis platform 102 may recommend certain environmental parameter values that correlate with the particular customer demographic segment be implemented for the particular time period. For example, the suitability analysis platform 102 may generate recommendations 220 for the retail site 208(m).

In other embodiments, the suitability analysis platform 102 may translate the environmental parameter values of a retail site into environmental parameter descriptions, such as noisy, quiet, hot, cold, etc. The suitability analysis platform 102 may further compare such environmental parameter descriptions for a retail site with environmental parameter descriptions posted on online review websites for the retail site to determine if the posted environmental parameter descriptions are accurate. For example, the suitability analysis platform 102 may compare the environmental parameter descriptions for a retail site that are posted on an online review site 222 by a service provider 224. Thus, if the posted descriptions are not accurate, the suitability analysis platform 102 may send discrepancy notifications to the online review websites. For example, the suitability analysis platform 102 may send such a notification 226 to a server of the service provider 224 via an online error reporting portal.

Example User and IoT Device Components

Figure 3:
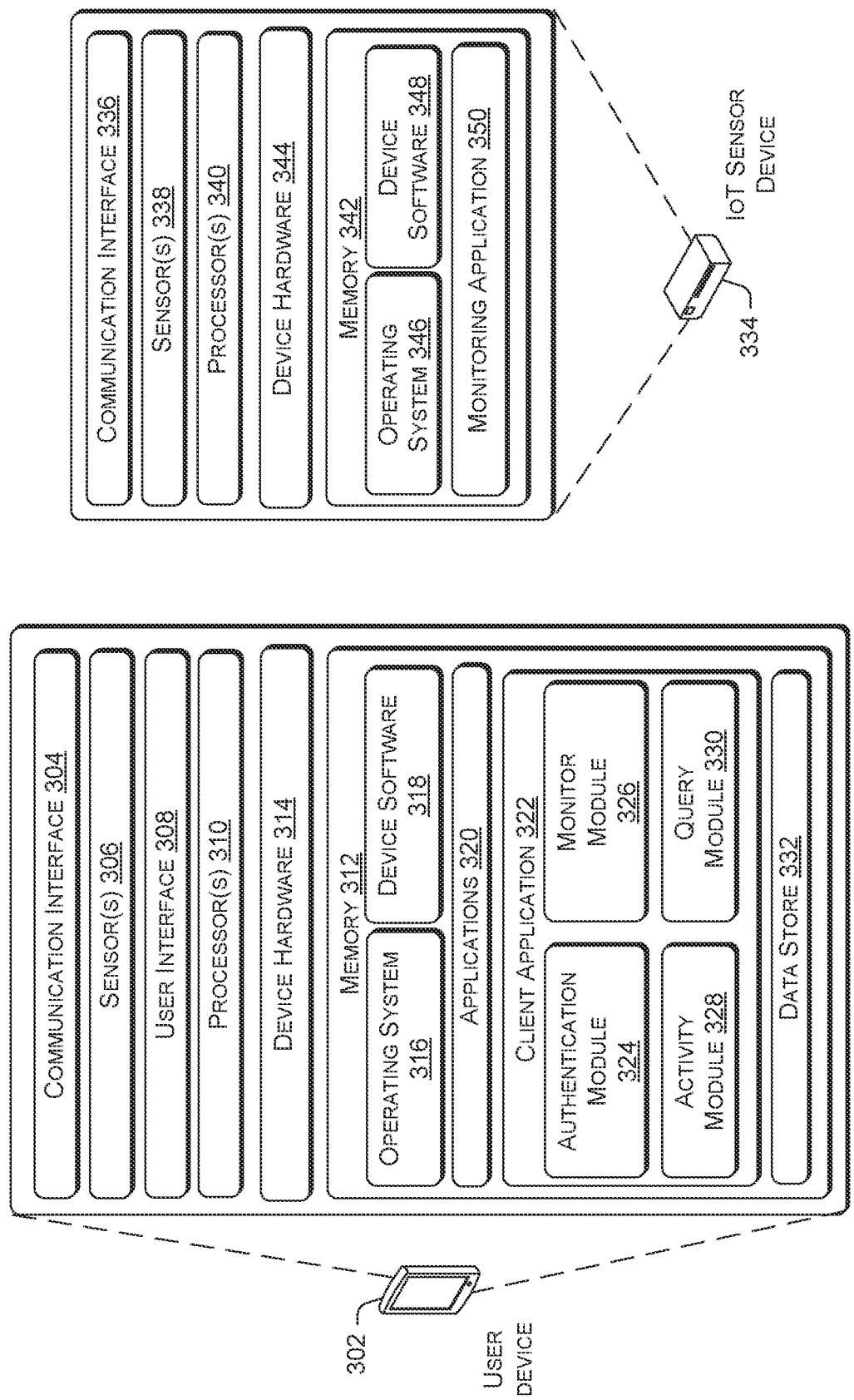
FIG. 3 is a block diagram showing various components of an example user device and an example IoT sensor device that are configured to use multiple sensors to detect environmental parameter values and report the values to a suitability analysis platform

FIG. 3 is a block diagram showing various components of an example user device and an example IoT sensor device that are configured to use multiple sensors to detect environmental parameter values and report the values to a suitability analysis platform. The user device 302 may include a communication interface 304, one or more sensors 306, a user interface 308, one or more processors 310, memory 312, and device hardware 314. The communication interface 304 may include wireless and/or wired communication components that enable the electronic device to transmit or receive voice or data communication via the wireless carrier network, as well as other telecommunication and/or data communication networks. The sensors 306 may include a proximity sensor, a compass, an accelerometer, biometric sensors, cameras, microphones, a global positioning system (GPS) sensor, among other built-in or attachable sensors. The proximity sensor may detect movement of objects that are proximate to the user device 302. The compass, the accelerometer, and the GPS sensor may detect orientation, movement, and geolocation of the user device 302. The cameras may capture images or ambient lighting levels of the environment around the user device 302.

The user interface 308 may enable a user to provide inputs and receive outputs from the user device 302. The user interface 308 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 312 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 314 may include a modem that enables the user device 302 to perform telecommunication and data communication with a network. The device hardware 314 may further include signal converters (e.g., a digital-to-analog converter, an analog-to-digital converter), antennas, hardware decoders and encoders, graphics processors, a universal integrated circuit card (UICC) or an embedded UICC (eUICC), and/or the like that enable the user device 302 to execute applications and provide telecommunication and data communication functions.

The one or more processors 310 and the memory 312 of the user device 302 may implement an operating system 316, device software 318, one or more applications 320, and the client application 322. Such software may include routines, program instructions, objects, and/or data structures that are executed by the processors 310 to perform particular tasks or implement particular abstract data types.

The operating system 316 may include components that enable the user device 302 to receive and transmit data via various interfaces (e.g., user controls, communication interface 304, and/or memory input/output devices). The operating system 316 may also process data using the one or more processors 310 to generate outputs based on inputs that are received via the user interface 308. For example, the operating system 316 may provide an execution environment for the execution of applications. The operating system 316 may include a presentation component that presents the output (e.g., display the data on an electronic display, store the data in memory, transmit the data to another electronic device, etc.).

The operating system 316 may include an interface layer that enables applications to interface with the modem and/or the communication interface 304. The interface layer may comprise public APIs, private APIs, or a combination of both public APIs and private APIs. Additionally, the operating system 316 may include other components that perform various other functions generally associated with an operating system. The device software 318 may include software components that enable the user device to perform functions. For example, the device software 318 may include basic input/output system (BIOS), bootrom, or a bootloader that boots up the user device 302 and executes the operating system 316 following power-up of the device.

The applications 320 may include applications that provide utility, entertainment, and/or productivity functionalities to a user of the user device 302. For example, the applications 320 may include telephony applications, electronic mail applications, remote desktop applications, web browser applications, navigation applications, office productivity applications, multimedia streaming applications, an online shopping application, and/or so forth.

The client application 322 may include an authentication module 324, a monitor module 326, an activity module 328, and a query module 330. The memory 312 may be further configured to implement a data store 332. The authentication module 324 may present interface menus that enable a user to create or submit login credentials to establish and access a user account with the suitability analysis platform 102. The login credentials may include a user identifier, a user password, user biometric data, and/or so forth. In some embodiments, the suitability analysis platform 102 may share user account information with the wireless communication carrier 106. Accordingly, the user may use the login credentials previously established with the wireless communication carrier 106 to access services provided by the suitability analysis platform 102.

The monitor module 326 may trigger one or more sensors on the user device 302 to measure environmental parameter values. The monitor module 326 may have permission to trigger the one or more sensors when a user of the user device 302 has provided the client application 322 with consent. For example, the monitor module 326 may present a permission configuration page via the user interface of the user device 302, in which the user may provide permission for the monitor module 326 to trigger the sensors via an input of consent (e.g., clicking on a checkbox, activating a virtual toggle switch, etc.). The input of consent is sent by the monitor module 326 to the suitability analysis platform 102 for recordation in a consent database. In some instances, the monitor module 326 may trigger the sensors when the GPS sensor detects that current geolocation coordinates (e.g., longitude, latitude) of the user device 302 are at or within a predetermined distance of the geolocation coordinates for a site to be monitor. For example, a list of sites to be monitored may be stored in the data store 332 of the user device 302, in which the list may be updated or modified by the suitability analysis platform 102. In other instances, the monitor module 326 may trigger the sensors when the module detects via a radio sensor or a radio transceiver a short-range radio beacon (e.g., a Bluetooth beacon) that is deployed at a site to be monitored. For example, the short-range radio beacon may be configured to transmit a cryptographic key to the client application 322. Accordingly, the monitor module 326 may trigger the sensors when the cryptographic key matches a corresponding key stored in the data store 332.

The activity module 328 may present an interface menu that enables a user to designate one or more activities that are suitable for different sites. For example, the interface menu may include a selectable list of sites that are associated with a geographical area of the user. The geographical area may be automatically selected based on a detected geolocation of the user device 302 or selected based on geographical information inputted into a data entry field of the interface menu by the user. Each of the sites in the list may be expanded to further reveal additional information regarding the site, such as an address of the site, geographical information regarding the site, one or more environmental parameter values associated with the site, a picture of the site, a video of the site, and/or so forth. Following the selection of a site, the interface menu may present a list of potential activities that may be performed at the sites. Thus, by using the information displayed via the interface menu and/or their personal knowledge and familiarity with a site, the user may designate a specific site as being suitable for one or more activities. For example, a user may designate a coffee shop with average ambient noise of less than 50 decibels and an average air temperature of 70° F. as being suitable for working on a computer. The designated relationship between the activity and the one or more environmental parameters are then sent by the activity module 328 to the suitability analysis platform 102.

In some embodiments, the activity module 328, may incentivize the user to designate suitability of the sites for one or more activities with points and/or credits that can be redeemed for products or services. For example, the activity module 328 may be directed by the suitability analysis platform 102 to display notification messages on the user device 302 either on a main screen of the user device 302 or following an opening of the client application 322. In some embodiments, a notification may indicate that the user may be awarded bonus points and/or credits, recognition titles, or other incentives for accomplishing certain goals related to the suitability designations. These goals may include being the first user to designate an activity for a specific site, designate activities for the most number of sites, and/or so forth.

The query module 330 may present an interface menu that enables a user to query for sites for performing a specific activity, in which site has one or more environmental parameter values that match or are closest to one or more environmental value criteria. For example, the interface menu may include a selectable list of activities that the user desires to perform, as well as a data field in which the user may designate a geographical area (e.g., a city and state) where the user desires to perform the activity. Following the input of such information, the interface menu may prompt the user to specify one or more environmental parameter value criteria of one or more corresponding environmental parameters of a desired site for performing the activity is to possess. For example, the interface menu may present a list of environmental parameters that can be selected. Once an environmental parameter is selected, the interface menu may enable the user to manipulate an interface control (e.g., a slider bar, a data entry field, radio buttons, etc.) to designate the corresponding parameter value criterion. For example, a slider bar may enable the selection of an appropriate decibel value as the environmental parameter value criterion for ambient noise level. The interface menu may enable the user to specify the environmental parameter value criteria for a current time and date or a future time and date at which the user is expected to perform the activity. Additionally, the interface menu may enable the user to designate the environmental parameter value criteria as for environmental parameter values at the specified date and time, for average parameter values during a time duration that include the specified date and time, or for average parameter values during a time duration that include the specified date and time and over a recurring time interval, such as over a week, a month, a season, a year, or any other configurable time frame. The multiple query parameters are then sent by the query module 330 to the suitability analysis platform 102.

In return, the suitability analysis platform 102 may provide one or more sites with one or more environmental parameter values that match or are closest to the one or more query parameter values. Furthermore, by analyzing the queries received from the user devices of multiple users, the suitability analysis platform 102 may determine one or more environmental parameter values that are most commonly requested, i.e., associated with each activity. Such association may enable the suitability analysis platform 102 to recommend at least one site that has one or more most common environmental parameter values associated with an activity. For example, in some instances, the query module 330 may receive a query for sites for performing a specific activity, in which the query does not include any environmental parameter value criteria. In such instances, the suitability analysis platform 102 may select at least one site that has one or more most common environmental parameter values associated with the activity. The one or more sites may be presented by the interface menu of the client application 322 via a suitability map that includes the geographical area where the user desires to perform the activity.

The IoT sensor device 334 may include a communication interface 336, one or more sensors 338. one or more processors 340, memory 342, and device hardware 344. The communication interface 336 may include wireless and/or wired communication components that enable the electronic device to transmit or receive voice or data communication via the wireless carrier network, as well as other telecommunication and/or data communication networks. The sensors 338 may include an ambient light level sensor, an air temperature sensor, a humidity sensor, an ambient noise sensor, an air quality sensor, a radio signal sensor for detecting the presence of short-range communication signals or long-range communication signals, and/or so forth.

The memory 342 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 344 may include a cellular modem that enables the IoT sensor device 334 to perform telecommunication and data communication with a wireless carrier network of the wireless communication carrier 106, as well as one or more short-range transceivers that enable the device to connect to other devices via short-range wireless communication links. The device hardware 344 may further include signal converters, antennas, hardware decoders and encoders, graphics processors, a UICC, an eUICC, and/or the like that enable the IoT sensor device 334 to execute applications and provide telecommunication and data communication functions.

The one or more processors 340 and the memory 342 of the IoT sensor device 334 may implement an operating system 346, device software 348, and a monitoring application 350. Such software may include routines, program instructions, objects, and/or data structures that are executed by the processors 340 to perform particular tasks or implement particular abstract data types.

The operating system 346 may include components that enable the IoT sensor device 334 to receive and transmit data via various interfaces (e.g., user controls, communication interface 336, and/or memory input/output devices). The operating system 346 may also process data using the one or more processors 340 to generate output based on input. For example, the operating system 346 may provide an execution environment for the execution of the monitoring application 350. The operating system 346 may include a presentation component that presents the output (e.g., display the data on an electronic display, store the data in memory, transmit the data to another electronic device, etc.).

The operating system 346 may include an interface layer that enables applications to interface with the modem and/or the communication interface 336. The interface layer may comprise public APIs, private APIs, or a combination of both public APIs and private APIs. Additionally, the operating system 346 may include other components that perform various other functions generally associated with an operating system. The device software 348 may include software components that enable the user device to perform functions.

The monitoring application 350 may receive environmental parameter values from the sensors 338 and store the values in a data cache. In turn, the monitoring application 350 may send the environmental parameter values to the suitability analysis platform 102 via a network connection. In some embodiments, the monitoring application 350 may send the values via a push mechanism in which the application periodically uploads the values to the platform. In other embodiments, the monitoring application 350 may send the values via a pull mechanism in which the platform periodically requests the values from the application. In some instances, the monitoring application 350 may be configured by the suitability analysis platform 102 to vary the frequency at which the application takes measurements of the environmental parameter values using the sensors 338. For example, the suitability analysis platform 102 may provide a sampling schedule to the application for the application to follow.

Example Suitability Analysis Components

Figure 4:
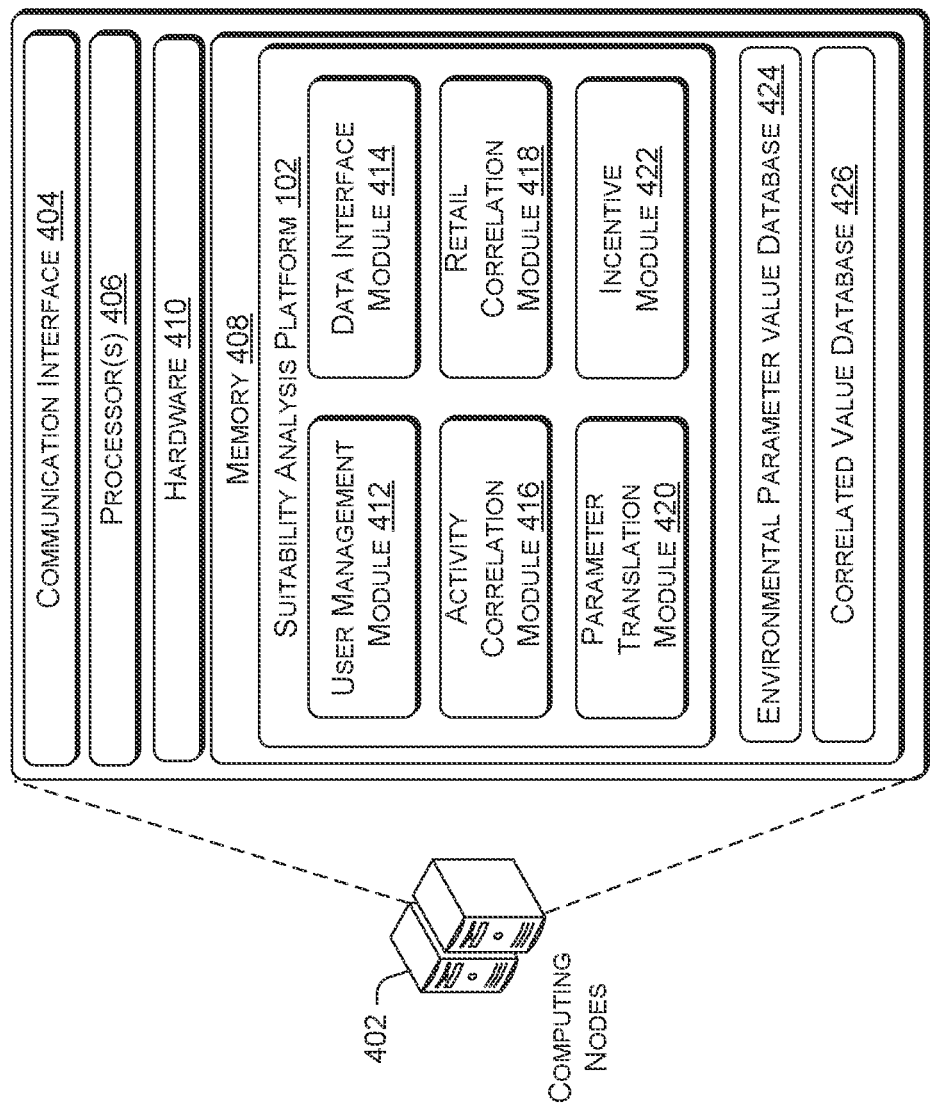
FIG. 4 is a block diagram showing various components of the suitability analysis platform that uses various detected environmental parameter values to determine the suitability of different sites for performing an activity.

FIG. 4 is a block diagram showing various components of the suitability analysis platform that uses various detected environmental parameter values to determine the suitability of different sites for performing an activity. The suitability analysis platform 102 may be implemented by computing nodes 402. The computing nodes 402 may include a communication interface 404, one or more processors 406, and memory 408. The communication interface 404 may include wireless and/or wired communication components that enable the one or more computing nodes 402 to transmit data to and receive data from other networked devices. The computing nodes 402 may be accessed via hardware 410. The hardware 410 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), highest-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The suitability analysis platform 102 may be stored in the memory 408 and executed by the one or more processors 406. The suitability analysis platform 102 may include a user management module 412, a data interface module 414, an activity correlation module 416, a retail correlation module 418, a parameter translation module 420, and an incentive module 422. The modules may include routines, program instructions, objects, and/or data structures that perform particular tasks or implement particular abstract data types. In various embodiments, the suitability analysis platform 102 may use protocols such as Hypertext Transfer Protocol (HTTP), HTTP Secure (HTTPS), File Transfer Protocol (FTP), etc., to exchange data with user devices, and protocols such as Constrained Application Protocol (CoAP) protocols, to exchange data with IoT sensor devices.

The user management module 412 may enable users to create customer accounts. For example, a user may establish a corresponding customer account by providing registration information to the user management module 412 via a user device. The registration information may include a customer name, a customer address, customer contact information, a login identifier, a password, and/or so forth. In some instances, the login identifier may be a user access identifier that is used by the wireless communication carrier 106 to authenticate the user. The registration information may also include the device identifiers of user devices that belong to the users. A device identifier of a user device may be a Mobile Station International Subscriber Directory Number (MSISDN), an International Mobile Equipment Identity (IMEI), an International Mobile Subscriber Identity (IMSI), a Mobile Equipment Identifier (MEID) in the form of an Electronic Serial Number (ESN). The user management module 412 may store such information of each user in a user profile database. Each of the customer accounts may also include account access information for one or more credit and/or financial accounts that a corresponding user previously provided for receiving points and/or credits that are redeemable for products or services. The customer accounts may enable the users to sign up to contribute environmental parameter values to the suitability analysis platform 102, as well as input queries for suitable sites for performing activities.

The data interface module 414 may receive environmental parameter values of various environmental parameters from multiple devices and store the environmental parameter values in an environmental parameter value database 424. The data interface module 414 may receive the environmental parameter values via a network, such as a local area network (LAN), a larger network such as a wide area network (WAN), or a collection of networks, such as the Internet. In some embodiments, an application on a device may push environmental parameter values to the data interface module 414. In other embodiments, the data interface module 414 may query a device to obtain environmental parameter values. For example, the data interface module 414 may include a workflow scheduler that schedules the retrieval of the environmental parameter values according to a configurable policy. For example, the configurable policy may specify the source data locations, dates and times of data retrievals, frequency of data retrievals, triggering events for the data retrievals, handling procedures for late arrival data, a data retention period, data disposal following an expiration of the data retention period, and/or so forth. Each of the environmental parameter values that is received by the data interface module 414 may include accompanying metadata. For example, the metadata for an environmental parameter value may include a date and time of the value collection, geolocation data (e.g., longitude, latitude, elevation) associated with the value collection, supplemental geolocation data (e.g., an address, floor level, etc.) associated with the value collection, a device identifier of the device that collected the value, a site identifier of the site where the value is collected, and/or so forth. In various embodiments, the data interface module 414 may aggregate the one or more environmental parameters collected for each site by site for storage in the environmental parameter value database 424. The aggregation may be performed based on the site identifier, geolocation data, and/or the supplemental geolocation data. For example, the data interface module 414 may include an internal location table that correlates the geolocation data to site identifiers.

In additional embodiments, the data interface module 414 may use data adaptors to retrieve the customer data from the databases that are maintained by an merchant that operates the retail sites 208(1)-208(m) or environmental parameter descriptions of sites from the servers of review websites, such as the online review site 222. For example, the data interface module 414 may use data-agnostic data adaptors to access unstructured databases, and/or database-specific data adaptors to access structured databases. In other embodiments, the data interface module 414 may use a web crawler algorithm to mine the environmental parameter descriptions of sites from the review websites.

The activity correlation module 416 may identify the one or more most suitable sites for performing each type of activity. In some embodiments, the activity correlation module 416 may be configured to average multiple environmental parameter values of an environmental parameter that is taken over a preconfigured time duration (e.g., every hour, every two hours, every four hours, etc.) to generate an average environmental parameter value for the time duration. For example, each of the environmental parameters may have a corresponding pre-configured time duration for which its environmental parameters are to be averaged. In additional embodiments, the activity correlation module 416 may average the environmental parameter values of an environmental parameter for a site that is taken at a specific time or time duration over a recurring time interval for a predetermined time period. For example, the ambient noise value for a site may be taken at 5:00 p.m. each day. Accordingly, the activity correlation module 416 may be configured to average the ambient noise values taken at such a time of day during a time interval of a week, a month, a season, a year, or any other configurable time frame to generate an average ambient noise level. In another example, the activity correlation module 416 may initially calculate an average ambient noise level of a site for a time duration between noon and 5:00 p.m. each day. Accordingly, the average ambient noise level of the time duration each day may be averaged during a time interval of a week, a month, a season, a year, or any other configurable time frame to generate an average ambient noise level for the time duration during the recurring time interval.

In one implementation, the activity correlation module 416 may receive queries for suitable sites for performing activities from user devices. Each of the queries may include one or more environmental parameter value criteria for at least one corresponding environmental parameter of a suitable site that are in a geographical area for performing a specific activity at a specified time and date. The environmental parameter value criteria may be designated as for environmental parameter values at the specified date and time, for average parameter values during a time duration that include the specified date and time, or for average parameter values during a time duration that include the specified date and time and over a recurring time interval. In some instances, such designation of the environmental parameter value criteria may trigger the activity correlation module 416 to calculate the corresponding average environmental parameter values over the corresponding date and time or the corresponding time duration that include the date and time for multiple sites in the geographical area. In turn, the activity correlation module 416 may provide responses to the queries in which each response includes information on one or more sites in the geographical area with one or more environmental parameter values that match or are closest to the one or more environmental parameter value criteria of the corresponding query. For example, if a query is for potential sites for working on a computer in the Bellevue, WA area tomorrow at noon, in which the site has an average ambient noise of less than 50 decibels and an average air temperature of 70° F., the activity correlation module 416 may return one or more sites that match the query. However, if no sites with environmental parameter values matching the corresponding criteria are found, the activity correlation module 416 may return a predetermined number of sites, such as one or two sites, with environmental parameter values that are closest to the corresponding criteria. In some instances, if no such sites with closest parameter values exist, the activity correlation module 416 may return no query result. Instead, the activity correlation module 416 may return an indication that no sites are found.

The activity correlation module 416 may further correlate the activities specified by the queries with the one or more sites having the one or more environmental parameter values to generate correlated environmental data for the one or more sites. Such correlated environmental data may be stored by the activity correlation module 416 in a correlated value database 426. In turn, the activity correlation module 416 may additionally analyze the correlated environmental data of multiple sites to determine a corresponding most common environmental parameter value for each of one or more environmental parameters associated with an activity. Subsequently, when the activity correlation module 416 receives a query for potential sites for performing an activity that are in a geographical area at a specified time and date, in which the query does not include a set of environmental parameter value criteria, the activity correlation module 416 may return a recommendation of at least one site that has at least one most common environmental parameter value associated with the activity. For example, the at least one site may include a site that has a highest number of most common environmental parameters associated with the particular activity. However, in some instances, the activity correlation module 416 may be unable to identify at least one site that has at least one most common environmental parameter value associated with the activity. In such instances, the activity correlation module 416 may return no query result. Instead, the activity correlation module 416 may return an indication that no sites are found.

In another implementation, the activity correlation module 416 may receive information regarding one or more activities that are designated as suitable for individual sites of multiple sites from user devices of users. In some embodiments, the information may be received from user devices of users that are incentivized to contribute such information, such as the user devices 114. Subsequently, the activity correlation module 416 may correlate the one or more activities that are designated as suitable for individual sites of the multiple sites with corresponding one or more environmental parameter values collected for the individual sites to generate correlated environmental data for the plurality of sites. Such correlated environmental data may be stored by the activity correlation module 416 in a correlated value database 426.

Subsequently, the activity correlation module 416 may receive a query for at least one suitable site for performing a specific activity. The query may include one or more environmental parameter value criteria for at least one corresponding environmental parameter of a suitable site that are in a geographical area for performing a specific activity at a specified time and date. The environmental parameter value criteria may be designated as for environmental parameter values at the specified date and time, for average parameter values during a time duration that include the specified date and time, or for average parameter values during a time duration that include the specified date and time and over a recurring time interval. In some instances, such designation of the environmental parameter value criteria may trigger the activity correlation module 416 to calculate the corresponding average environmental parameter values over the corresponding date and time or the corresponding time duration that include the date and time for multiple sites in the geographical area. In turn, the activity correlation module 416 may provide a response to the query in which the response includes information on one or more sites in the geographical area with one or more environmental parameter values that match or are closest to the one or more environmental parameter value criteria of the query. However, in some instances, if no such sites with closest parameter values exist, the activity correlation module 416 may return no query result. Instead, the activity correlation module 416 may return an indication that no sites are found.

Subsequently, when the activity correlation module 416 receives a query for potential sites for performing an activity that are in a geographical area at a specified time and date, in which the query does not include a set of environmental parameter value criteria, the activity correlation module 416 may return a recommendation of at least one site that has at least one most common environmental parameter value associated with the activity. For example, the at least one site may include a site that has a highest number of most common environmental parameters associated with the particular activity. However, in some instances, if the activity correlation module 416 is unable to identify at least one site that has at least one most common environmental parameter value associated with the activity, the activity correlation module 416 may return no query result. Instead, the activity correlation module 416 may return an indication that no sites are found.

In various embodiments, a response or a recommendation that is generated by the activity correlation module 416 may include a visual presentation that displays environmental parameter values associated with the sites included in the geographical area specified by the query. In some instances, the visual presentation may include a suitability map that shows the location of one or more suitable sites relative to the geographical area. Each site representation on the map may be selectable to present additional information regarding the site. The additional information may include associated environmental parameter values for the specified date and time in the query, address information for the site, site identification of the site, and/or so forth.

The retail correlation module 418 may determine one or more environmental parameter values that are conducive to retail activity. In some embodiments, the retail correlation module 418 may be configured to average multiple environmental parameter values of an environmental parameter that is taken over a preconfigured time duration (e.g., every hour, every two hours, every four hours, etc.) to generate an average environmental parameter value for the time duration. For example, each of the environmental parameters may have a corresponding pre-configured time duration for which its environmental parameters are to be averaged. In additional embodiments, the activity correlation module 416 may average the environmental parameter values of an environmental parameter for a retail site that is taken at a specific time or time duration over a recurring time interval for a predetermined time period.

In one implementation, the retail correlation module 418 may receive customer purchase metrics of customers associated with each retail site of the multiple retail sites. The retail correlation module 418 may receive the customer purchase metrics from the customer data sources 212. The retail correlation module 418 may compare the customer purchase metrics at each retail site with the one or more environmental parameter values collected for each retail site to determine one or more environmental parameter values of a retail site that correlated with a highest customer purchase metric. For example, the customer purchase metric may be a number of total purchase transactions during a time period (e.g., per hour, per day, etc.), a total customer purchase transaction value during a time period, an average number of transactions per customer during a time period, an average customer purchase transaction value per customer during a time period, and/or so forth. Accordingly, the one or more environmental parameter values being compared may be values from a specified date and time, an average value of environmental parameter values during a time duration, or an average of parameter values during a time duration over a recurring time interval. In this way, the retail correlation module 418 may provide a recommendation to implement the one or more environmental parameter values at an additional retail site with at least one environmental parameter value that is different from at least one corresponding environmental parameter value of the one or more environmental parameter values to increase consumer activity.

In another implementation, the retail correlation module 418 may receive customer activity metrics of customers who visited each site of multiple sites. In various embodiments, the sites may be locations within a retail site or retail sites. The retail correlation module 418 may receive the customer activity metrics from the customer data sources 212. The retail correlation module 418 may compare the customer activity metrics at each location of a site with the one or more environmental parameter values collected for each site to determine one or more environmental parameter values of a site that correlated with a highest customer activity metric. For example, the customer activity metric may be a number of total customer visits during a time period (e.g., per hour, per day, etc.), a total amount of customer loitering time during a time period, an average number of customer visits during a time period, an average amount of customer loitering time per customer during a time period, and/or so forth. Accordingly, the one or more environmental parameter values being compared may be values from a specified date and time, an average value of environmental parameter values during a time duration, or an average of parameter values during a time duration over a recurring time interval. In this way, the retail correlation module 418 may provide a recommendation to implement the one or more environmental parameter values at an additional site with at least one environmental parameter value that is different from at least one corresponding environmental parameter value of the one or more environmental parameter values to increase consumer activity. The additional site may be a location within a retail site or a retail site.

In another implementation, the retail correlation module 418 may receive customer demographic information of customers who visited and/or made a purchase at each retail site of the multiple retail sites. The retail correlation module 418 may receive the customer demographic information from the customer data sources 212 and/or social media sources 214. For example, the retail correlation module 418 may use the device identifiers of the user devices to look up the customer identifier information of the corresponding customers that are associated with user devices. The lookup of the customer identifier information may be performed using customer account information retrieved from the wireless communication carrier 106. In turn, the customer identifier information may be used by the retail correlation module 418 to retrieve customer demographic information from the customer data sources 212.

The retail correlation module 418 may compare the customer demographic information at each retail site with the one or more environmental parameter values collected for each retail site to determine one or more environmental parameter values that correspond to demographic information of the customers who visited each retail site. In some embodiments, the one or more environmental parameter values being compared may be values from a specified date and time, an average value of environmental parameter values during a time duration, or an average of parameter values during a time duration over a recurring time interval. Subsequently, the retail correlation module 418 may receive customer demographic information of customers for an additional retail site. In response, the retail correlation module 418 may provide a recommendation of one or more particular environmental parameter values for implementation at the additional retail site based on the additional demographic information. For example, the implementation of the one or more particular environmental parameters may encourage the customers with the customer demographic information to feel more comfortable at the additional retail site, which may lead them to increase the duration of their visits and/or make purchases. In other embodiments, the analysis of customer demographic information by the retail correlation module 418 may indicate that customers of different customer demographic segments visits a retail site at different time periods throughout a day. Accordingly, when a retail location is visited by customers that are predominately in a particular customer demographic segment, such as during a particular time period of the day, the retail correlation module 418 may recommend certain environmental parameter values that correlate with the particular customer demographic segment be implemented at the retail site for the particular time period.

The parameter translation module 420 may translate one or more environmental parameter values as collected for a retail site into one or more environmental parameter descriptions. The translation of an environmental parameter value into an environmental parameter description may be performed based on a particular value range of preconfigured multiple value ranges in which the environmental parameter value falls. For example, if an environmental parameter value in the form of an ambient decibel level is less than 50, then the ambient decibel level may be translated into an environmental parameter description of "quiet". However, if the ambient decibel level is between 50 and 70, then the ambient decibel level may be translated into an environmental parameter description of "average amount of noise". However, if the ambient decibel level is great than 70, then the ambient decibel level may be translated into an environmental parameter description of "noisy". In another example, if an environmental parameter value in the form of air temperature is less than 60° F., then the air temperature may be translated into an environmental parameter description of "cold". However, if the air temperature is between 60° F. and 75° F., then the air temperature may be translated into an environmental parameter description of "warm". However, if the air temperature is great than 75° F., then the air temperature may be translated into an environmental parameter description of "hot".

Subsequently, the parameter translation module 420 may provide the one or more parameter descriptions to an online review site, such as the online review site 222, that reviews the retail site. In various embodiments, the online review site may have a pre-established relationship with the operator of the suitability analysis platform 102. Thus, the parameter translation module 420 may use an online portal (e.g. a web address) and/or a web application program interface (API) hosted by a server of the online review site to send to the one or more parameter descriptions for the retail site to the server. In turn, a web application on the server of the online review site may be configured to post the one or more environmental parameter values into an online review of the retail site that is hosted by the server.

In other embodiments, the parameter translation module 420 may determine whether at least one existing environmental parameter value posted on the online review site for the retail site does not match at least one environmental parameter value translated by the parameter translation module 420. If there is a mismatch, the parameter translation module 420 may send a notification of at least one mismatch to the server of the online review site. In turn, a service provider that operates the online review site may decide based on the notification whether to correct at least one existing environmental parameter description with the environmental parameter description provided by the parameter translation module 420. In such embodiments, the parameter translation module 420 may use an online portal and/or a web application program interface (API) hosted by a server of the online review site to exchange environmental parameter descriptions and notifications with the online review site.

The incentive module 422 may track the number of environmental parameter values that are received from various user devices and IoT sensor devices based on the device identifiers included in the metadata of the received environmental parameter values. For example, the incentive module 422 may use the device identifiers to look up the associated customer accounts. The customer accounts are then credited with points and/or credits for the contributed environmental parameter values based on an award schedule. For example, the award schedule may specify a certain amount of points and/or credits are to be credited for contributing a predetermined number of environmental parameter values. The customers who receive the points and/or credits may include users who are subscribers of the wireless communication carrier, in which the user devices of the users are used to collect the environmental parameter values, users who used their user devices to contribute, as well as operators of sites who agree to have IoT sensors deployed at their sites. In some instances, the award schedule may specify a predetermined amount of bonus award points and/or credits for certain achievements, such as being the first user to use a device to obtain an environmental parameter value at a site, a user whose device collected the most environmental parameter values at a site in a predetermined time period, a user whose device collected environmental parameter values from the most number of sites in a predetermined time period, and/or so forth.

In other embodiments, the incentive module 422 may track the number of activity classifications that the users submitted for different sites. For example, the incentive module 422 may use the user identifiers of the submissions to look up the associated customer accounts. The customer accounts are then credited with points and/or credits for the contributed environmental parameter values based on an award schedule. In some instances, the award schedule may specify a predetermined amount of bonus award points and/or credits for certain achievements, such as being the first user to provide an activity classification for a site, a user who submitted activity classifications for the most number of sites in a predetermined time period, and/or so forth. In some embodiments, the incentive module 422 may further trigger user devices to display notification messages that encourage users to use their user devices to contribute environmental parameter values or activity classifications for sites.

Example Processes

FIGS. 5-10 present illustrative processes 500-1000 for using various detected environmental parameter values to determine suitability of different sites for performing an activity or suitability of different sites for consumer activities. Each of the processes 500-1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-1000 are described with reference to the architectures 100 and/or 200 of FIG. 1.

Figure 5:
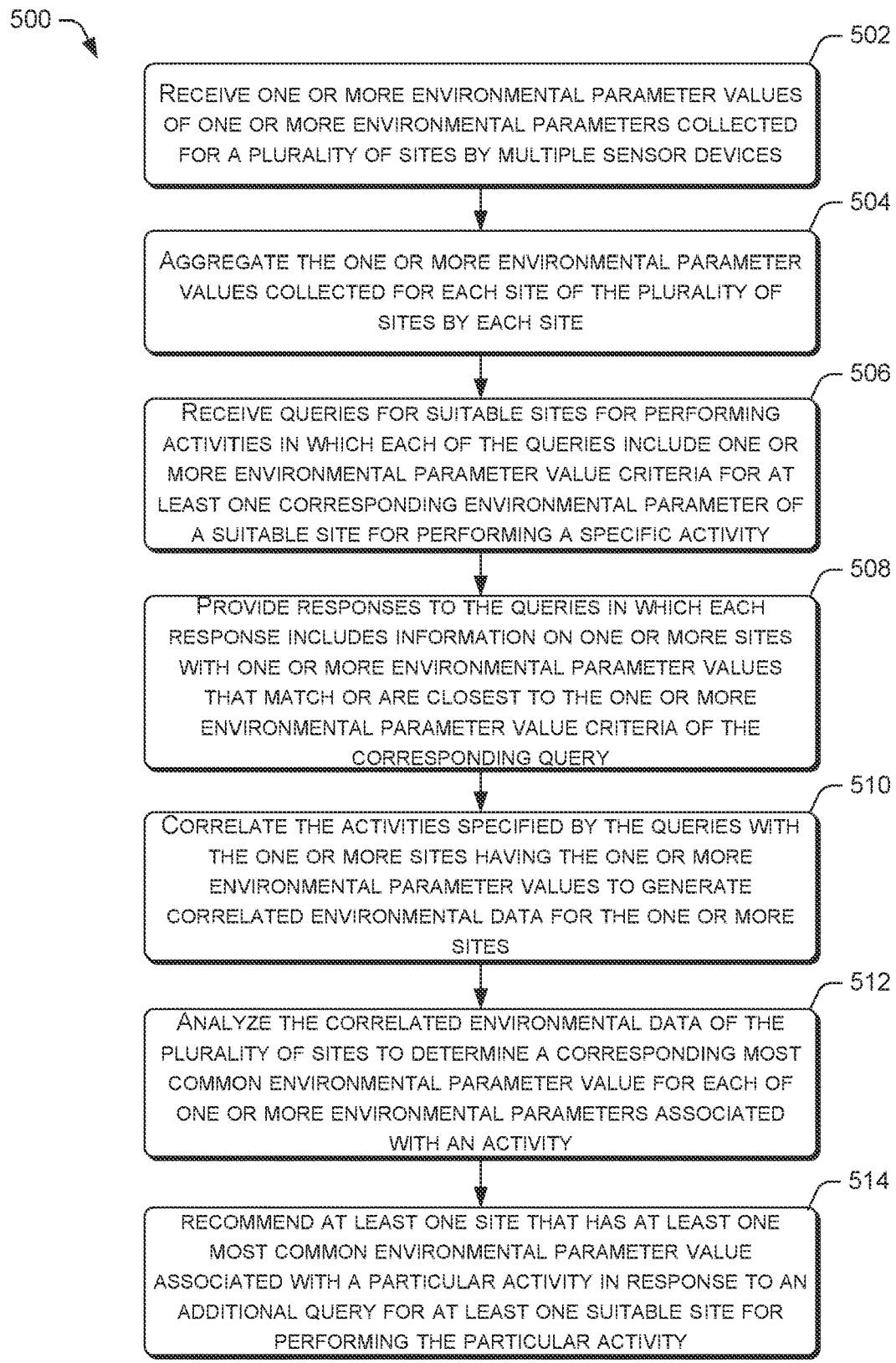
FIG. 5 is a flow diagram of a first example process for using various detected environmental parameter values to determine suitability of different sites for performing an activity.

FIG. 5 is a flow diagram of a first example process 500 for using various detected environmental parameter values to determine suitability of different sites for performing an activity. At block 502, the suitability analysis platform 102 may receive one or more environmental parameter values of one or more environmental parameters collected for a plurality of sites by multiple sensor devices. For example, the plurality of sites may include retail sites, such as the retail sites 208(1)-208(m). In various embodiments, the sensor devices may include IoT sensor devices 104(1)-104(k) or user devices 108(1)-108(n). At block 504, the suitability analysis platform 102 may aggregate the one or more environmental parameter values collected for each site of the plurality of sites by each site. At block 506, the suitability analysis platform 102 may receive queries for suitable sites for performing activities in which each of the queries include one or more environmental parameter value criteria for at least one corresponding environmental parameter of a suitable site for performing a specific activity. For example, the queries may be initiated by users 116 via the user devices 114.

At block 508, the suitability analysis platform 102 may provide responses to the queries in which each response includes information on one or more sites of the plurality of sites with one or more environmental parameter values that match or are closest to the one or more environmental parameter value criteria of the corresponding query. At block 510, the suitability analysis platform 102 may correlate the activities specified by the queries with one or more sites having the one or more environmental parameter values to generate correlated environmental data for the one or more sites.

At block 512, the suitability analysis platform 102 may analyze the correlated environmental data of the plurality of sites to determine a corresponding most common environmental parameter value for each of the one or more environmental parameters associated with an activity. At block 514, the suitability analysis platform 102 may recommend at least one site that has at least one most common environmental parameter value associated with a particular activity in response to an additional query for at least one suitable site for performing the particular activity. For example, the additional query may be a user query 120 that is inputted at the user device 126 by the user 124.

Figure 6:
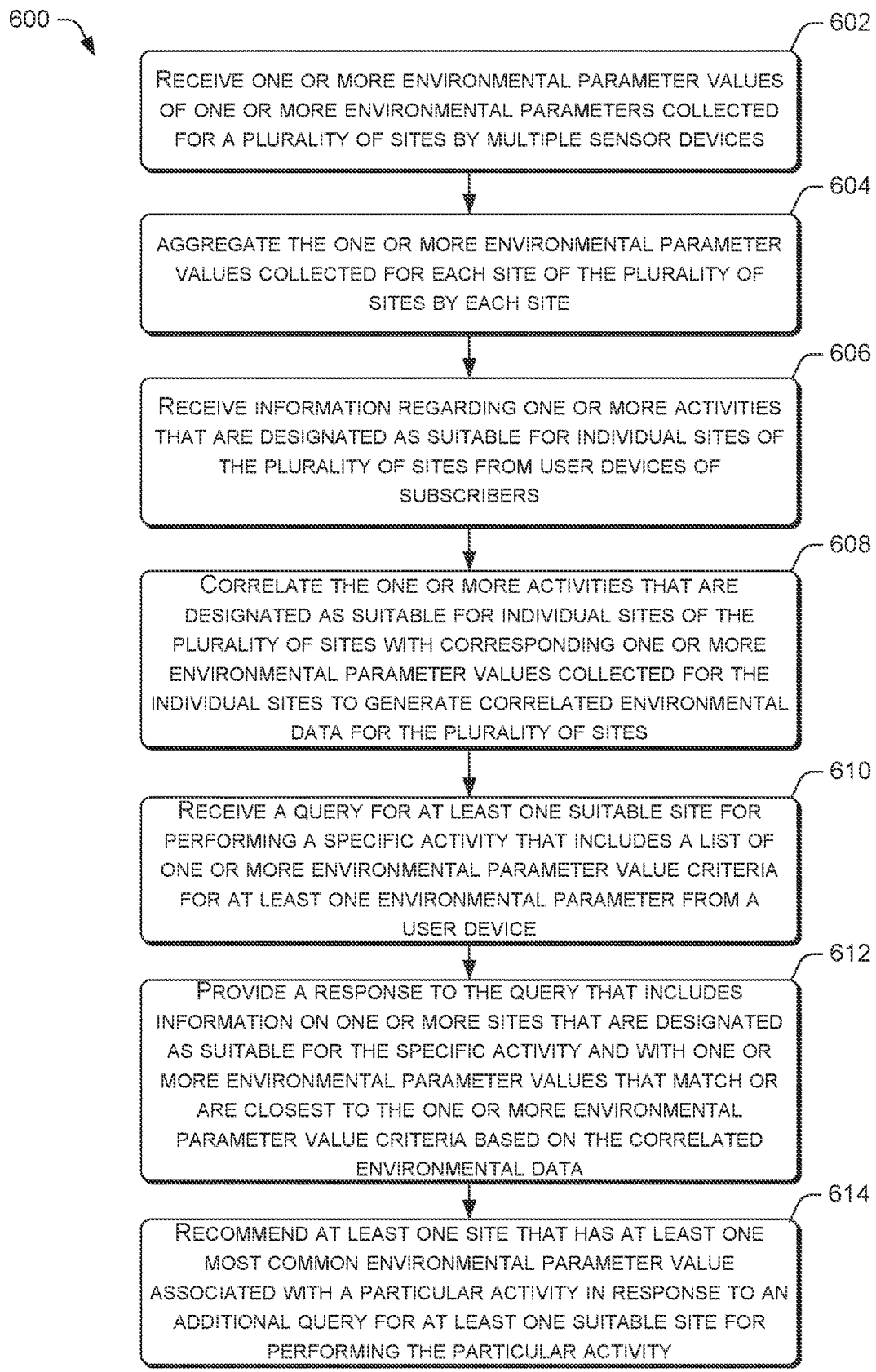
FIG. 6 is a flow diagram of a second example process for using various detected environmental parameter values to determine suitability of different sites for performing an activity.

FIG. 6 is a flow diagram of a second example process 600 for using various detected environmental parameter values to determine suitability of different sites for performing an activity. At block 602, the suitability analysis platform 102 may receive one or more environmental parameter values of one or more environmental parameters collected for a plurality of sites by multiple sensor devices. For example, the plurality of sites may include retail sites, such as the retail sites 208(1)-208(m). In various embodiments, the sensor devices may include IoT sensor devices 104(1)-104(k) or user devices 108(1)-108(n).

At block 604, the suitability analysis platform 102 may aggregate the one or more environmental parameter values collected for each site of the plurality of sites by each site. At block 606, the suitability analysis platform 102 may receive information regarding one or more activities that are designated as suitable for individual sites of the plurality of sites from user devices of the subscribers. For example, the platform 102 may receive the information from the user devices 114 of the users 116.

At block 608, the suitability analysis platform 102 may correlate the one or more activities that are designated as suitable for individual sites of the plurality of sites with corresponding one or more environmental parameter values collected for the individual sites to generate correlated environmental data for the plurality of sites.

At block 610, the suitability analysis platform 102 may receive a query for at least one suitable site for performing a specific activity that includes a list of one or more environmental parameter value criteria for at least one environmental parameter for a user device. For example, the platform 102 may receive the user query 120 from the user device 126 of the user 124.

At block 612, the suitability analysis platform 102 may provide a response to the query that includes information on one or more sites that are designated as suitable for the specific activity and with one or more environmental parameter values that match or are closest to the one or more environmental parameter value criteria based on the correlated environmental data. For example, the response may include site information 122 that is sent by the platform to the user device 126. At block 614, the suitability analysis platform 102 may recommend at least one site that has at least one most common environmental parameter value associated with a particular activity in response to an additional query for at least one suitable site for performing the particular activity. For example, the at least one site may include a site that has a highest number of most common environmental parameters associated with the particular activity.

Figure 7:
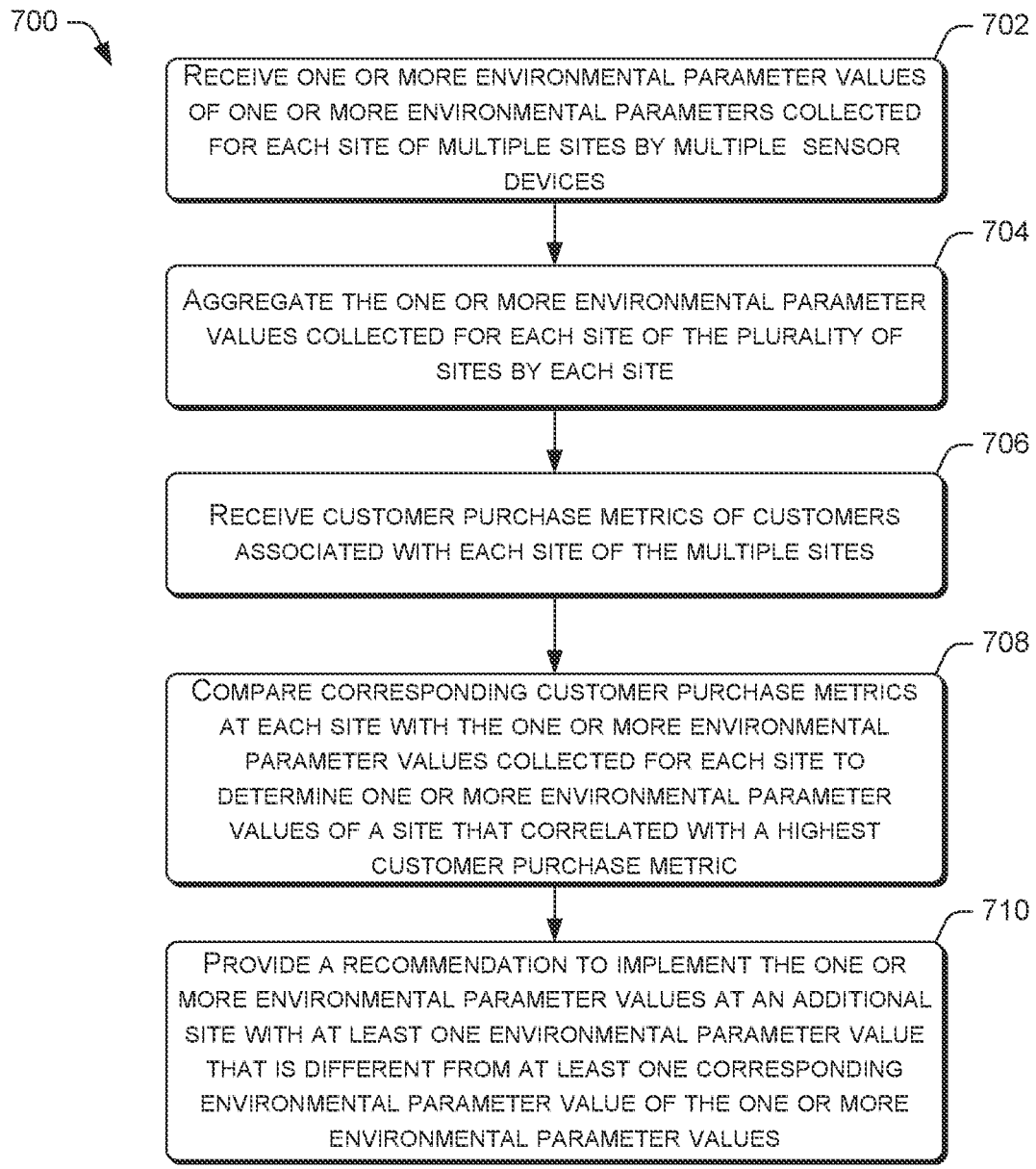
FIG. 7 is a flow diagram of an example process for using various detected environmental parameter values and customer purchase metrics to determine suitability of different sites for consumer activity.

FIG. 7 is a flow diagram of an example process 700 for using various detected environmental parameter values and customer purchase metrics to determine suitability of different sites for consumer activity. At block 702, the suitability analysis platform 102 may receive one or more environmental parameter values of one or more environmental parameters collected for each site of multiple sites by multiple sensor devices. In various embodiments, the sites may include retail sites, such as the retail sites 208(1)-208(m). The multiple sensor devices may include IoT sensor devices 202(1)-202(k) and/or user devices 204(1)-204(n).

At block 704, the suitability analysis platform 102 may aggregate the one or more environmental parameter values collected for each site of the plurality of sites by each site. At block 706, the suitability analysis platform 102 may receive customer purchase metrics of customers associated with each site of the multiple sites. In various embodiments, the platform 102 may receive the customer purchase metrics from the customer data sources 212. At block 708, the suitability analysis platform 102 may compare corresponding customer purchase metrics at each site with the one or more environmental parameter values collected for each site to determine one or more environmental parameter values of a site that correlated with a highest customer purchase metric.

At block 710, the suitability analysis platform 102 may provide a recommendation to implement the one or more environmental parameter values at an additional site with at least one environmental parameter value that is different from at least one corresponding environmental parameter value of the one or more environmental parameter values.

Figure 8:
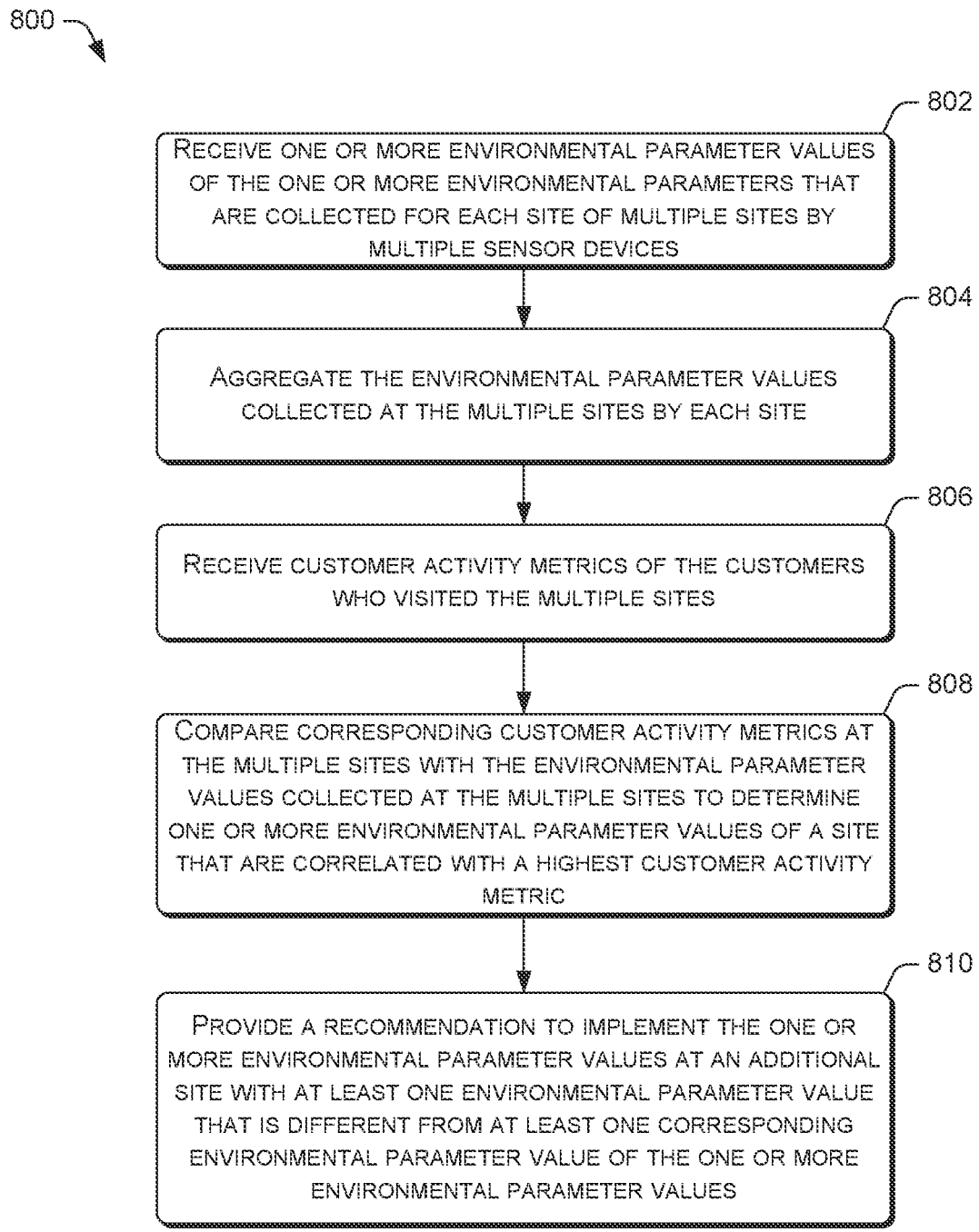
FIG. 8 is a flow diagram of an example process for using various detected environmental parameter values and customer activity metrics to determine suitability of different sites for consumer activity.

FIG. 8 is a flow diagram of an example process 800 for using various detected environmental parameter values and customer activity metrics to determine suitability of different sites for consumer activity. At block 802, the suitability analysis platform 102 may receive one or more environmental parameter values of the one or more environmental parameters that are collected for each site of the multiple sites by multiple sensor devices. The multiple sensor devices may include IoT sensor devices 202(1)-202(k) and/or user devices 204(1)-204(n). The multiple sites may be multiple locations within a retail site or multiple retail sites. At block 804, the suitability analysis platform 102 may aggregate the environmental parameter values collected at the multiple sites by each site. At block 806, the suitability analysis platform 102 may receive customer activity metrics of the customers who visited the multiple sites. At block 808, the suitability analysis platform 102 may compare corresponding customer activity metrics at the multiple sites with the location parameter values collected at the multiple sites to determine one or more environmental parameter values of a site that are correlated within a highest customer activity metric. At block 810, the suitability analysis platform 102 may provide a recommendation to implement to the one or more environmental parameter values at an additional site with at least one environmental parameter value that is different from at least one corresponding environmental parameter of the one or more environmental parameter values.

Figure 9:
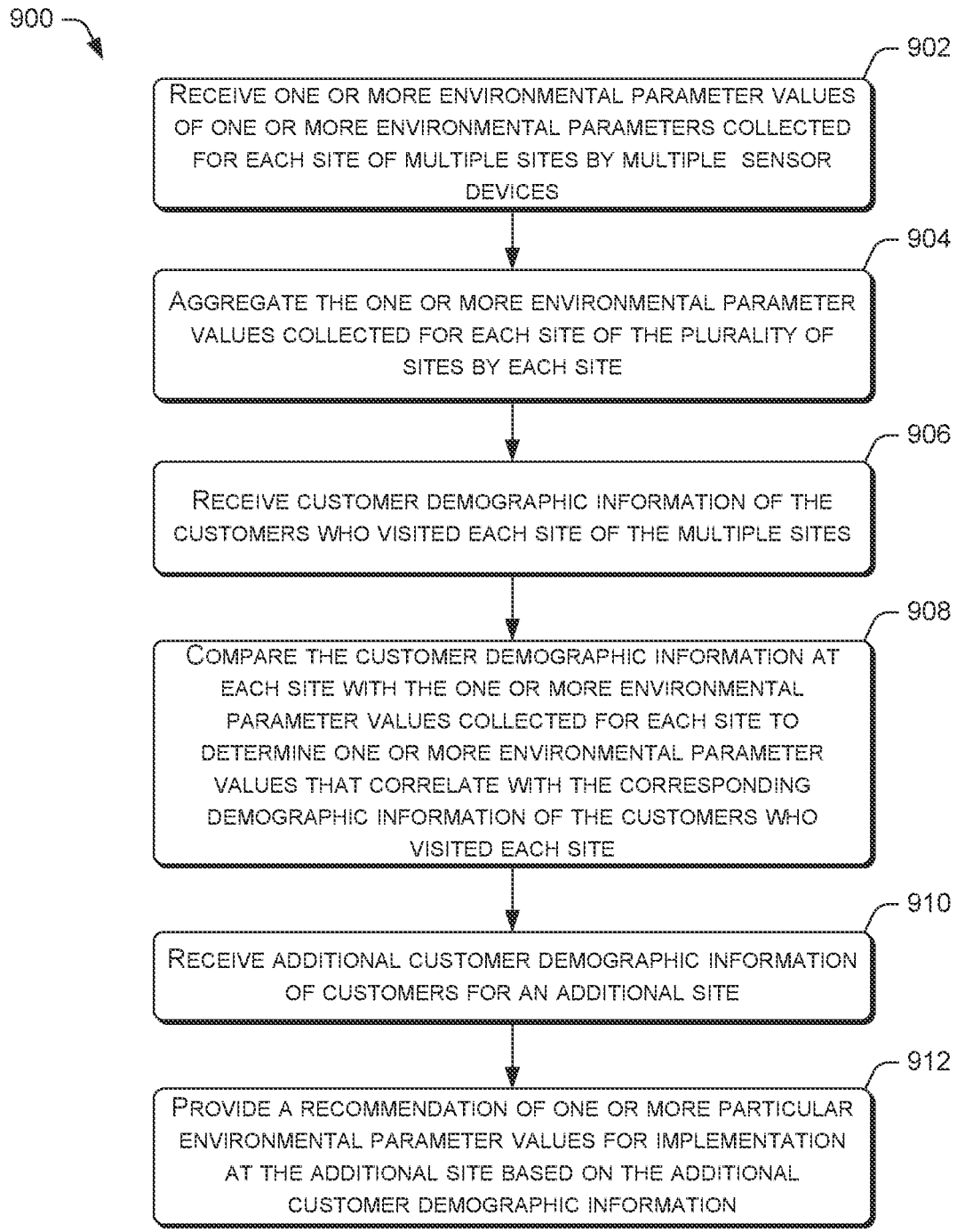
FIG. 9 is a flow diagram of an example process for using various detected environmental parameter values and customer demographic information to determine suitability of different sites for consumer activity.

FIG. 9 is a flow diagram of an example process 900 for using various detected environmental parameter values and customer demographic information to determine suitability of different sites for consumer activity. At block 902, the suitability analysis platform 102 may receive one or more environmental parameter values of one or more environmental parameters collected for each site of the multiple sites by multiple sensor devices. For example, the plurality of sites may include retail sites, such as the retail sites 208(1)-208(m). The multiple sensor devices may include IoT sensor devices 202(1)-202(k) and/or user devices 204(1)-204(n). At block 904, the suitability analysis platform 102 may aggregate the one or more environmental parameter values collected for each site of the plurality of sites by each site.

At block 906, the suitability analysis platform 102 may receive customer demographic information of the customers who visited each site of the multiple sites. In various embodiments, the platform 102 may receive the customer demographic information from the customer data sources 212 and/or the social media sources 214. At block 908, the suitability analysis platform 102 may compare the customer demographic information at each site with the one or more environmental parameter values collected for each site to determine one or more environmental parameter values that correlate with the corresponding demographic information of the customers who visited each site.

At block 910, the suitability analysis platform 102 may receive additional demographic information of customers for an additional site. At block 912, the suitability analysis platform 102 may provide a recommendation of one or more particular environmental parameter values for implementation at the additional site based on the additional customer demographic information.

Figure 10:
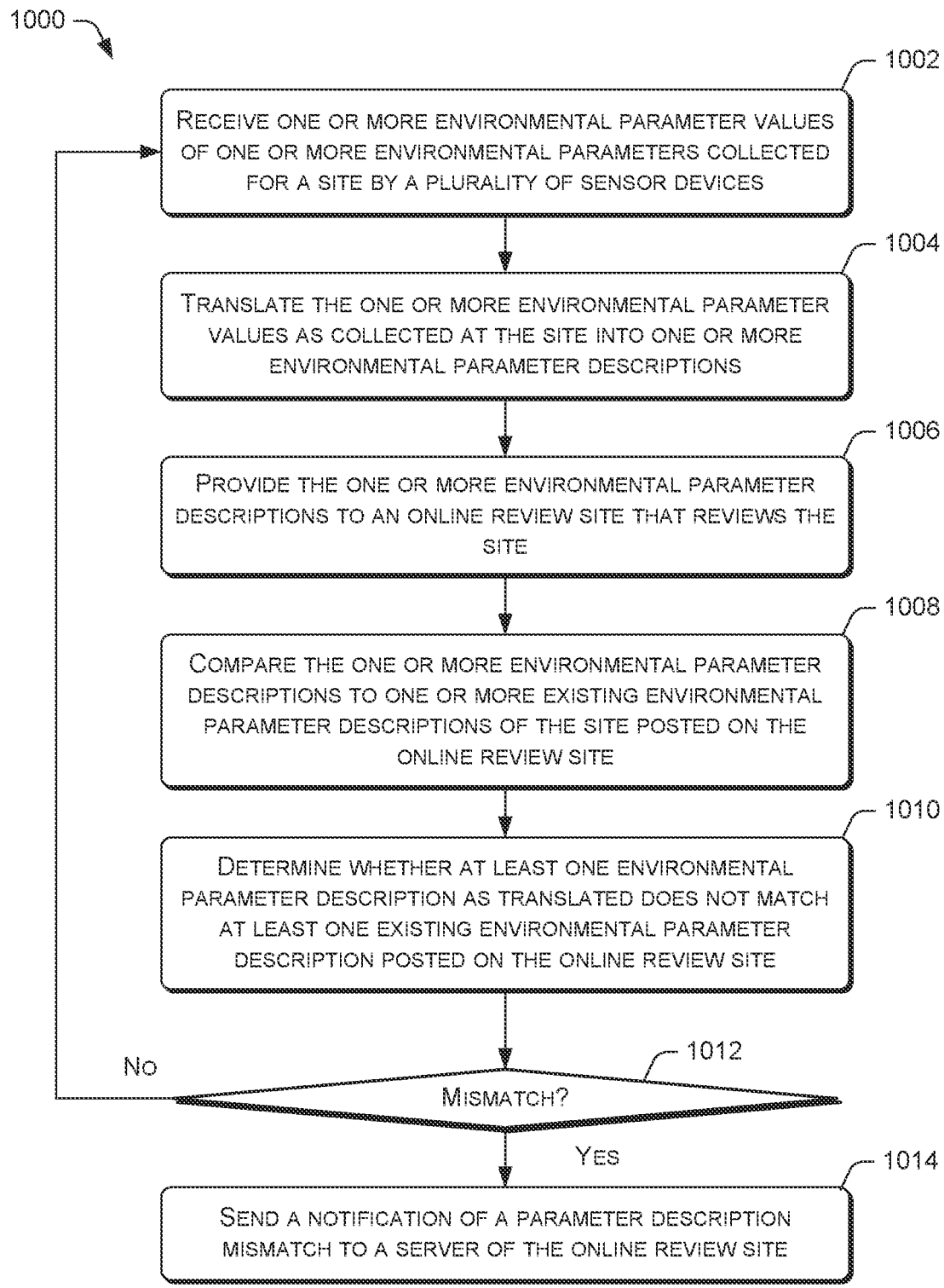
FIG. 10 is a flow diagram of an example process for translating one or more environmental parameter values into environmental parameter descriptions and sending the description to an online review site.

FIG. 10 is a flow diagram of an example process 1000 for translating one or more environmental parameter values into environmental parameter descriptions and sending the description to an online review site. At block 1002, the suitability analysis platform 102 may receive one or more additional environmental parameter values of one or more environmental parameters collected for a site by a plurality of sensor devices. The plurality of sensor devices may include IoT sensor devices 202(1)-202(k) and/or user devices 204(1)-204(n).

At block 1004, the suitability analysis platform 102 may translate the one or more environmental parameter values as collected at the site into one or more environmental parameter descriptions. At block 1006, the suitability analysis platform 102 may provide one or more environmental parameter descriptions to an online review site that reviews the site. For example, the platform 102 may provide the one or more environmental parameter descriptions to a server of the service provider 224 that operates the online review site 222.

At block 1008, the suitability analysis platform 102 may compare the one or more environmental parameter descriptions to one or more existing environmental parameter descriptions of the site posted on the online review site. For example, the platform 102 may obtain the one or more environmental parameter descriptions from the server of the service provider 224 that operates the online review site 222.

At block 1010, the suitability analysis platform 102 may determine whether at least one environmental parameter description as translated does not match at least one existing environmental parameter description posted on the online review site. At decision block 1012, if there is a mismatch of the descriptions ("yes" at decision block 1012), the process 1000 may proceed to block 1014. At block 1014, the suitability analysis platform 102 may send a notification of a parameter description mismatch to a server of the online review site. For example, the platform 102 may send the notification 226 to a server of the service provider 224. Returning to decision block 1012, if there is no mismatch of the descriptions ("no" at decision block 1012), the process 1000 may loop back to block 1002.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving one or more environmental parameter values of one or more environmental parameters collected for a plurality of sites by multiple sensor devices, the multiple sensor devices include at least one of user devices and IoT sensor devices, wherein the one or more environmental parameters include at least one of air temperature, humidity, air quality, ambient noise, or whether a wireless network signal is present;

aggregating the one or more environmental parameter values collected for each site of the plurality of sites by each site;

determining suitability of the plurality of sites for performing particular activities, based on the aggregated environmental parameter values;

receiving queries from user devices for sites of the plurality of sites that would be suitable for performance of the particular activities, wherein each of the queries includes one or more environmental parameter value criteria for at least one corresponding environmental parameter value of a site determined to be a suitable site for performing one of the particular activities;

providing responses to the queries in which each response includes information about one or more sites of the plurality of sites having one or more environmental parameter values that render the one or more sites included in the responses suitable for the particular activity based on the one or more sites matching or coming closest to one or more environmental parameter value criteria of a corresponding query;

correlating the activities specified by the queries with the one or more sites included in the responses to generate correlated environmental data for the one or more sites;

analyzing the correlated environmental data of the plurality of sites;

determining, based on the analysis, a corresponding most common environmental parameter value for each of one or more environmental parameters associated with an activity;

returning a recommendation of at least one of the plurality of sites determined to have at least one of the most common environmental parameter values;

correlating at least some of the environmental parameter values to consumer activity metrics for at least some of the plurality of sites;

determining, based on the correlation, recommended environmental parameter values for adoption by the at least some of the plurality of sites to increase future values of the consumer activity metrics;

providing the recommended environmental parameter values to the at least some of the plurality of sites;

providing an incentive to a user account associated with a user device when the one or more environmental parameter values are received from the user device, wherein providing the incentive includes providing the incentive when the user device is a first user device to collect the one or more environmental parameter values from the site, when the user device collects a most number of environmental parameter values from the site, or when the user device collects one or more environmental parameter values from the site at a specific time of a configurable time frame.

2. The one or more non-transitory computer-readable media of claim 1, wherein the recommendation is a recommendation of at least one site based on whether the at least one site has at least one most common environmental parameter associated with a particular activity in response to an additional query for at least one site that is suitable for performing the particular activity.

3. The one or more non-transitory computer-readable media of claim 2, wherein the at least one site includes a site that has a highest number of most common environmental parameters associated with the particular activity.

4. The one or more non-transitory computer-readable media of claim 1, wherein the acts further comprise generating a visual presentation that displays environmental parameter values associated with the sites.

5. The one or more non-transitory computer-readable media of claim 1, wherein the receiving includes receiving environmental parameter values of one or more environmental parameters that are collected during a configurable time frame.

6. The one or more non-transitory computer-readable media of claim 5, wherein the queries include a query that is for performing the specific activity during a particular time period of the configurable time frame, and the responses include a response that provides specific information on one or more sites with one or more environmental parameter values that match or are closest to the one or more environmental parameter value criteria during the particular time period of the configurable time frame.

7. The one or more non-transitory computer-readable media of claim 1, wherein the incentive includes at least one of points or credits redeemable for products or services from a merchant.

8. A system, comprising:
one or more processors; and
memory including a plurality of computer-executable components that are executable by the one or more processors to perform a plurality of actions, the plurality of actions comprising:
receiving one or more environmental parameter values of one or more environmental parameters collected for a plurality of sites by multiple sensor devices, the multiple sensor devices include at least one of user devices and IoT sensor devices, wherein the one or more environmental parameters include at least one of air temperature, humidity, air quality, ambient noise, or whether a wireless network signal is present;
aggregating the one or more environmental parameter values collected for each site of the plurality of sites by each site;
determining suitability of the plurality of sites for performing particular activities, based on the aggregated environmental parameter values;
receiving information regarding particular activities that are designated as suitable for individual sites of the plurality of sites from user devices of subscribers;
correlating the particular activities that are designated as suitable for individual sites of the plurality of sites with corresponding one or more environmental parameter values collected for the individual sites to generate correlated environmental data for the plurality of sites;
receiving a query from a user device for at least one of the plurality of sites that would be suitable for performing a specific one of the particular activities that includes a list of one or more environmental parameter value criteria for at least one environmental parameter from a user device;
providing a response to the query that includes information about one or more sites of the plurality of sites that are designated as suitable for the specific activity and with one or more environmental parameter values that match or are closest to the one or more environmental parameter value criteria;
correlating at least some of the environmental parameter values to consumer activity metrics for at least some of the plurality of sites;
determining, based on the correlation, recommended environmental parameter values for adoption by the at least some of the plurality of sites to increase future values of the consumer activity metrics;
providing the recommended environmental parameter values to the at least some of the plurality of sites;
providing an incentive to a user account associated with at least one user device when the one or more environmental parameter values are received from the at least one user device, wherein providing the incentive includes providing the incentive when the at least one user device is a first user device to collect the one or more environmental parameter values from a site, when the at least one user device collects a most number of environmental parameter values from the site, or when the at least one user device collects one or more environmental parameter values from the site at a specific time of a configurable time frame.

9. The system of claim 8, wherein the actions further comprise returning a recommendation of at least one site that has at least one most common environmental parameter associated with a particular activity in response to an additional query for at least one suitable site for performing the particular activity.

10. The system of claim 9, wherein the receiving includes receiving environmental parameter values of one or more environmental parameters that are collected during a configurable time frame, and wherein the additional query is for performing the particular activity during a particular time period of the configurable time frame, and wherein the recommending includes recommending a site that has at least one most common environmental parameter associated with a particular activity during the particular time period of the configurable time frame.

11. A computer-implemented method, comprising:
receiving, at one or more computing nodes, one or more environmental parameter values of one or more environmental parameters collected for each site of multiple sites by multiple sensor devices that include at least one of one or more user devices or one or more IoT sensor device, wherein the one or more environmental parameters include at least one of air temperature, humidity, air quality, ambient noise, or whether a wireless network signal is present;
aggregating, at the one or more computing nodes, the one or more environmental parameter values collected for each site of the multiple sites by each site;
receiving, at the one or more computing nodes, customer purchase metrics of customers associated with each site of the multiple sites;
comparing, at the one or more computing nodes, the customer purchase metrics at each site with the one or more environmental parameter values collected for each site;
determining one or more environmental parameter values of a site that correlated with a highest customer purchase metric, wherein the one or more environmental parameter values include local environmental parameter values of the one or more environmental parameters that are collected at multiple locations within the site;
providing, at the one or more computing nodes, a recommendation to implement the one or more environmental parameter values at an additional site with at least one environmental parameter value that is different from at least one corresponding environmental parameter value of the one or more environmental parameter values;
receiving customer activity metrics of the customers who visited the multiple locations within the site;
comparing the customer activity metrics at the multiple locations of the site with the local environmental parameter values collected at the multiple locations to determine one or more local environmental parameter values of a location that are correlated with a highest customer activity metric;

providing a recommendation to implement the one or more local environmental parameter values at an additional location with at least one local environmental parameter value that is different from at least one corresponding local environmental parameter value of the one or more local environmental parameter values;

receiving one or more additional environmental parameter values of one or more environmental parameters collected for a particular site by a plurality of sensor devices, wherein the plurality of sensor devices include an IoT sensor device deployed by an operator at the particular site, and wherein the operator of the particular site receives an incentive from a merchant for deployment of the IoT sensor device;

translating the one or more additional environmental parameter values as collected at the particular site into one or more environmental parameter descriptions;

providing the one or more environmental parameter descriptions to an online review site that reviews the particular site;

comparing the one or more environmental parameter descriptions to one or more existing environmental parameter descriptions of the site posted on the online review site; and in response to determining that at least one environmental parameter description does not match at least one existing environmental parameter description posted on the online review site, sending a notification of a parameter description mismatch to a server of the online review site.

12. The computer-implemented method of claim 11, further comprising:

receiving customer demographic information of the customers who visited each site of the multiple sites;

comparing the customer demographic information at each site with the one or more environmental parameter values collected for each site to determine one or more environmental parameter values that correlate with corresponding customer demographic information of the customers who visited each site;

receiving additional customer demographic information of customers for an additional site; and providing an additional recommendation of one or more particular environmental parameter values for the additional site based on the additional customer demographic information.

13. The computer-implemented method of claim 11, wherein the receiving the customer demographic information includes receiving the customer demographic information from at least one of a database of a merchant that operates the multiple sites or one or more social media sites.

* * * * *